United States Patent
Scholte et al.

(10) Patent No.: US 12,492,283 B2
(45) Date of Patent: Dec. 9, 2025

(54) (METH)ACRYLATE-FUNCTIONALIZED OLIGOMERS AND METHODS OF PREPARING AND USING SUCH OLIGOMERS

(71) Applicant: Arkema France, Colombes (FR)

(72) Inventors: Jon Scholte, Exton, PA (US); Brendan Mcgrail, Exton, PA (US)

(73) Assignee: Arkema France, Puteaux (FR)

( * ) Notice: Subject to any disclaimer, the term of this patent is extended or adjusted under 35 U.S.C. 154(b) by 967 days.

(21) Appl. No.: 17/627,562

(22) PCT Filed: Jul. 16, 2020

(86) PCT No.: PCT/IB2020/000621
§ 371 (c)(1),
(2) Date: Jan. 14, 2022

(87) PCT Pub. No.: WO2021/009565
PCT Pub. Date: Jan. 21, 2021

(65) Prior Publication Data
US 2022/0259370 A1      Aug. 18, 2022

Related U.S. Application Data

(60) Provisional application No. 62/875,014, filed on Jul. 17, 2019.

(51) Int. Cl.
| | |
|---|---|
| *C08G 18/67* | (2006.01) |
| *C08G 18/22* | (2006.01) |
| *C08G 18/40* | (2006.01) |
| *C08G 18/42* | (2006.01) |
| *C08G 18/48* | (2006.01) |
| *C08G 18/75* | (2006.01) |
| *C08G 18/76* | (2006.01) |
| *C08L 75/16* | (2006.01) |
| *C09J 175/16* | (2006.01) |

(52) U.S. Cl.
CPC ......... *C08G 18/672* (2013.01); *C08G 18/227* (2013.01); *C08G 18/40* (2013.01); *C08G 18/4018* (2013.01); *C08G 18/4236* (2013.01); *C08G 18/4277* (2013.01); *C08G 18/428* (2013.01); *C08G 18/48* (2013.01); *C08G 18/4825* (2013.01); *C08G 18/4833* (2013.01); *C08G 18/4854* (2013.01); *C08G 18/755* (2013.01); *C08G 18/757* (2013.01); *C08G 18/7621* (2013.01); *C08L 75/16* (2013.01); *C09J 175/16* (2013.01); *C08G 2115/00* (2021.01); *C08G 2170/40* (2013.01)

(58) Field of Classification Search
CPC .. C08G 18/672; C08G 18/48; C08G 2115/00; C08G 2170/40; C08G 18/227; C08G 18/4018; C08G 18/4236; C08G 18/4277; C08G 18/428; C08G 18/4825; C08G 18/4833; C08G 18/4854; C08G 18/757; C08G 18/7621; C08G 18/755; C08G 18/40; C08L 75/16; C09J 175/16

See application file for complete search history.

(56) References Cited

U.S. PATENT DOCUMENTS

| | | | |
|---|---|---|---|
| 4,131,602 | A | 12/1978 | Hodakowski et al. |
| 5,219,896 | A | 6/1993 | Coady et al. |
| 5,965,460 | A | 10/1999 | Rach et al. |
| 6,562,881 | B2 | 5/2003 | Jacobine et al. |
| 2017/0158803 | A1 | 6/2017 | Amin et al. |
| 2021/0340343 | A1 | 11/2021 | Gu et al. |
| 2022/0062828 | A1 | 3/2022 | Gu et al. |
| 2022/0062829 | A1 | 3/2022 | Gu et al. |

FOREIGN PATENT DOCUMENTS

| | | |
|---|---|---|
| CN | 102942672 A | 2/2013 |
| CN | 108794695 A1 | 11/2018 |
| CN | 109401719 A | 3/2019 |
| EP | 0584970 A2 | 3/1994 |
| EP | 0819714 A1 | 1/1998 |

(Continued)

OTHER PUBLICATIONS

Polymer Chemistry "Enhancement of Microphase Ordering and Mechanical Properties of Supramolecular Hydrogen-bonded Polyurethane Networks"; Danile Hermida-Merino et al.; Sep. 2018 pp. 3406-3414.

*Primary Examiner* — Rabon A Sergent
(74) *Attorney, Agent, or Firm* — Christopher R. Lewis

(57) ABSTRACT

(Meth)acrylate-functionalized oligomers having a) an oligomeric backbone comprised of first segments and second segments and b) (meth)acrylate-functionalized end groups are provided. Such oligomers are useful as components of curable compositions. The first segments, second segments and (meth)acrylate-functionalized end groups are linked together by linking moieties derived from a polyisocyanate. The first segments are residues of a first segment precursor containing a plurality of repeating units and a plurality of isocyanate-reactive functional groups and having a number average molecular weight of at least 250 daltons. The second segments are residues of a second segment precursor, different from the first segment precursor, containing a plurality of repeating units and a plurality of isocyanate-reactive functional groups and having a number average molecular weight of at least 250 daltons. The first segment and the second segment exhibit a Hansen Solubility Parameter Distance Relative Energy Difference of at least about 4 and not more than about 9.

28 Claims, 2 Drawing Sheets

(56) References Cited

FOREIGN PATENT DOCUMENTS

| | | |
|---|---:|---|
| EP | 1070682 A1 | 1/2001 |
| JP | 63030557 A | 2/1988 |
| JP | 01085969 A | 3/1989 |
| JP | 01229022 A | 9/1989 |
| JP | H06107993 A | 4/1994 |
| JP | 07207230 | 8/1995 |
| JP | 07207230 A | 8/1995 |
| JP | 11292943 A | 10/1999 |
| JP | 11322867 A | 11/1999 |
| JP | 2000144032 A | 5/2000 |
| JP | 2000204232 A | 7/2000 |
| JP | 2000204233 A | 7/2000 |
| WO | WO9810003 A1 | 3/1998 |
| WO | WO9847954 A1 | 10/1998 |
| WO | WO2005010587 A1 | 2/2005 |
| WO | WO2005068529 A1 | 7/2005 |
| WO | WO2005105857 A1 | 11/2005 |
| WO | WO2012163593 A1 | 12/2012 |
| WO | WO15098307 A1 | 7/2015 |
| WO | WO15098308 A1 | 7/2015 |
| WO | WO2020141481 A1 | 7/2020 |

(METH)ACRYLATE-FUNCTIONALIZED OLIGOMERS AND METHODS OF PREPARING AND USING SUCH OLIGOMERS

CROSS-REFERENCE TO RELATED APPLICATIONS

This application is a U.S. national stage application under 35 U.S.C. § 371 of international application number PCT/IB2020/000621, filed Jul. 16, 2020, which claims priority to U.S. patent application No. 62/875,014, filed April Jul. 17, 2019.

FIELD OF THE INVENTION

The invention relates to (meth)acrylate-functionalized oligomers, methods of preparing such oligomers, curable compositions based on the oligomers, methods of using the oligomers, and compositions and articles containing the oligomers in cured form.

BACKGROUND OF THE INVENTION

Many different types of (meth)acrylate-functionalized oligomers are known in the art, including (meth)acrylate-functionalized urethane oligomers which are characterized by having one or more (meth)acrylate functional groups substituted on an oligomeric polyurethane backbone (typically, at terminal ends of the oligomer). (Meth)acrylate-functionalized urethane oligomers may be synthesized by various methods, including, for instance, reacting a polymeric polyol such as a polyether polyol, polycarbonate polyol or polyester polyol with an excess of polyisocyanate to form an isocyanate-functionalized urethane prepolymer and then reacting the isocyanate-functionalized urethane prepolymer with a reagent, such as hydroxyethyl(meth) acrylate, which contains both an isocyanate-reactive functional group and a (meth)acrylate functional group. Such (meth)acrylate-functionalized urethane oligomers have been found to be useful components of compositions capable of being cured (polymerized) using UV irradiation or other methods to form cured compositions which function as coatings, adhesives, sealants, additive manufacturing resins, molding resins and the like.

For example, US Patent Application Publication No. 2017/0158803 A1 describes urethane acrylic polymers which are reaction products of ingredients which include [i] a first homopolymeric or co-polymeric polycarbonate poyol; [ii] an organic polyisocyanate; and [iii] a hydroxyl-functional acrylate or methacrylate.

In another example, U.S. Pat. No. 6,562,881 B2 discloses urethane (meth)acrylate capped resins prepared from alkoxylated adducts of polyols which have been reacted with a polyisocyanate component and a hydroxyalkyl (meth) acrylate.

Further, U.S. Pat. No. 5,219,896 teaches photocurable liquid coating compositions containing polycarbonate-based acrylate-terminated polyurethanes.

Although many different types of (meth)acrylate-functionalized urethane oligomers are already known in the art, there is still a demand for oligomers which are capable of providing enhanced or improved performance when used as components of curable compositions. In particular, it would be desirable to develop new (meth)acrylate-functionalized oligomers which increase the tensile properties of cured articles, such as films, which are prepared from curable compositions containing such oligomers. Advantageously, such improved oligomers would have additional characteristics such as relatively low viscosity, low haze, and good compatibility with the reactive diluents and other components typically utilized in such curable compositions.

SUMMARY OF THE INVENTION

According to certain aspects of the invention, (meth) acrylate-functionalized oligomers are provided which are comprised of, consist essentially or consist of a) an oligomeric backbone comprised of first segments and second segments and b) (meth)acrylate-functionalized end groups, wherein the first segments, second segments and (meth) acrylate-functionalized end groups are linked together by linking moieties derived from a polyisocyanate and wherein the first segments are residues of a first segment precursor containing a plurality of repeating units and a plurality of isocyanate-reactive functional groups and having a number average molecular weight of at least 250 daltons and the second segments are residues of a second segment precursor, different from the first segment precursor, containing a plurality of repeating units and a plurality of isocyanate-reactive functional groups and having a number average molecular weight of at least 250 daltons, wherein a Hansen Solubility Parameter Distance Relative Energy Difference between the first segment and the second segment is at least about 4 and not more than about 9.

Methods of making such oligomers are also provided by the present invention, including a method wherein the first and second segment precursors are reacted sequentially with polyisocyanate to form an isocyanate-terminated intermediate oligomer which is then end-capped with a (meth)acrylate compound comprised of an isocyanate-reactive functional group and at least one (meth)acrylate functional group to provide the (meth)acrylate-functionalized oligomer as well as a method wherein the first and second segment precursors are reacted simultaneously with polyisocyanate to form an isocyanate-terminated intermediate oligomer which is then end-capped with a (meth)acrylate compound comprised of an isocyanate-reactive functional group and at least one (meth)acrylate functional group to provide the (meth)acrylate-functionalized oligomer.

The (meth)acrylate-functionalized oligomers may be cured by various mechanisms, including photocuring, to provide cured compositions having useful properties such as improved tensile strength. The (meth)acrylate-functionalized oligomers may be formulated with other reactive components and other additives to obtain curable compositions that can be utilized as coatings, adhesives, sealants, additive manufacturing resins and the like.

Figure 1:
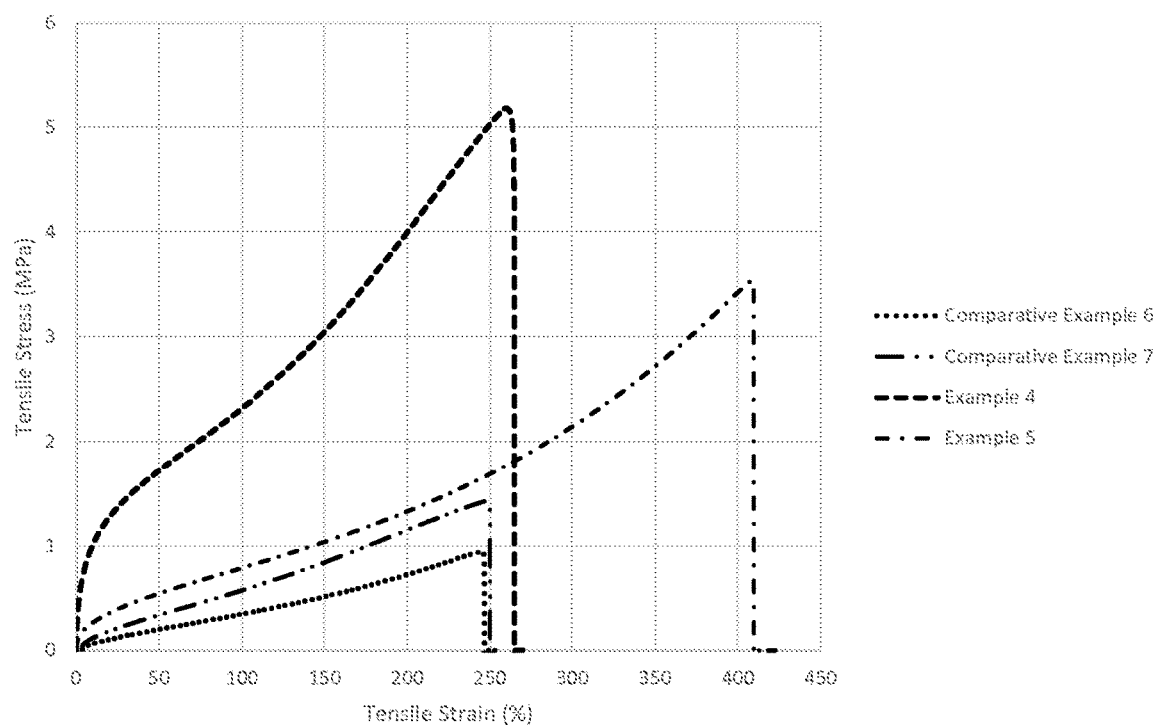
FIG. 1 is a graphical representation comparing the tensile properties of segmented and unsegmented urethane-acrylate oligomers in cured form (Examples 5 and 6 and comparative Examples 7 and 8).

DETAILED DESCRIPTION OF EMBODIMENTS OF THE INVENTION (Meth)Acrylate-Functionalized Oligomer The (meth)acrylate-functionalized oligomers of the present invention may be described as oligomeric substances which are comprised of a) an oligomeric backbone comprised of at least one first segment and at least one second segment different from the first segment and b) (meth)acrylate-functionalized end groups. As used herein, the term "(meth)acrylate" refers to both acrylate and methacrylate. The first segment(s), second segment(s) and (meth)acrylate-functionalized end groups are linked together by linking moieties derived from a polyisocyanate (in particular, a diisocyanate). The first segments are residues of a first segment precursor which has a number average molecular weight of at least 250 daltons and which contains a plurality of repeating units and a plurality of isocyanate-reactive functional groups. The second segments are residues of a second segment precursor which has a number average molecular weight of at least 250 daltons and which contains a plurality of repeating units and a plurality of isocyanate-reactive functional groups. Additionally, the first segment and the second segment are selected to have a Hansen Solubility Parameter Distance Relative Energy Difference which is at least about 4 and not more than about 9.

The structure of an exemplary (non-limiting) (meth)acrylate-functionalized oligomer in accordance with aspects of the present invention may be illustrated schematically as follows (Formula I):

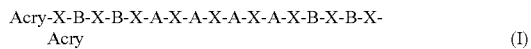
 (I)

wherein:
A=first segment (residue of a first segment precursor containing two isocyanate-reactive functional groups);
B=second segment (residue of a second segment precursor containing two isocyanate-reactive functional groups);
X=linking moiety derived from a diisocyanate; and
Acry=(meth)acrylate-containing moiety which includes a (meth)acrylate-functionalized end group.

Formula I is an example of a (meth)acrylate-functionalized oligomer having a "segmented" oligomeric structure, wherein the first segments A are clustered together (forming a segment X-A-X-A-X-A-X-A-X) and second segments B are also clustered together (forming the segments X-B-X-B-X).

The structure of another exemplary (non-limiting) (meth)acrylate-functionalized oligomer in accordance with aspects of the present invention may be illustrated schematically as follows (Formula II):

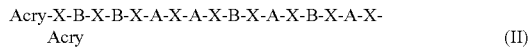
 (II)

wherein:
A=first segment (residue of a first segment precursor containing two isocyanate-reactive functional groups);
B=second segment (residue of a second segment precursor containing two isocyanate-reactive functional groups);
X=linking moiety derived from a diisocyanate; and
Acry=(meth)acrylate-containing moiety which includes a (meth)acrylate-functionalized end group.

Formula II is an example of a (meth)acrylate-functionalized oligomer having a "statistical" oligomeric structure, wherein the first segments A and second segments B are interspersed with each other in a random manner.

The first segment A and the second segment B differ from each other with respect to their chemical composition. They may also differ from each other with respect to their number average molecular weights. Each is a residue of a segment precursor containing two isocyanate-reactive functional groups (e.g., hydroxyl, thiol, primary amino or secondary amino) and a plurality of repeating units, such as a polyether polyol, polyester polyol or polycarbonate polyol. For example, segments A and B may each correspond to the general Formula (III'):

—O-[Polymer]-O— (III')

wherein [Polymer] is a polyoxyalkylene, polycarbonate or polyester chain, provided A and B differ from each other compositionally.

According to certain embodiments of the invention, X in structural formulae (I) and (II) (the linking moiety derived from a diisocyanate) may be represented by the following Formula (IV'):

—C(=O)NH—R—NHC(=O)— (IV')

wherein R is an organic moiety, such as a hydrocarbyl moiety.

In the above structural formulae (I) and (II), "Acryl" (the (meth)acrylate-containing moiety which includes a (meth)acrylate-functionalized end group) in certain embodiments may correspond to Formula (V'):

-Y-R$^1$—O—C(=O)CR$^2$=CH$_2$ (V')

wherein R$^1$ is a divalent organic moiety, R$^2$ is H or CH$_3$, and Y is O, S or NR$^3$, wherein R$^3$ is H or an alkyl group (e.g., a C1-C10 alkyl group). In certain embodiments, Y is NR$^3$ and R$^3$ is a tertiary alkyl group such as a t-butyl, t-amyl (t-pentyl), or t-hexyl group. Examples of suitable divalent organic moieties (R$^1$) include, for instance, alkylene (e.g., ethylene, propylene (such as —CH$_2$CH(CH$_3$)—), butylene), oligo(oxyalkylene) (e.g., oligo(oxyethylene)), alkoxylated oligo(caprolactone), alkoxylated oligo(lactide), and alkoxylated oligo(caprolactone-co-lactide), as well as possibly oligo(caprolactone), oligo(lactide), and oligo(caprolactone-co-lactide) also.

According to certain embodiments of the invention, the (meth)acrylate-functionalized oligomer is liquid at 25° C. In such embodiments, the viscosity of the (meth)acrylate-functionalized oligomer at 25° C. may be, for example, not more than 100,000 centipoise, not more than 50,000 centipoise, or not more than 25,000 centipoise. In other embodiments, however, the (meth)acrylate-functionalized oligomer may be solid at 25° C. Such a solid (meth)acrylate-functionalized oligomer may, when combined with one or more reactive diluents which are liquid at 25° C., form a composition which is liquid at 25° C. Such a liquid composition may comprise, for example, up to 40% by weight of liquid reactive diluent(s) based on the weight of the solid (meth)acrylate-functionalized oligomer.

The number average molecular weight of the (meth)acrylate-functionalized oligomer, as measured by gel permeation chromatography using polystyrene calibration standards, may be varied as may be desired to achieve targeted characteristics such as viscosity and the mechanical and physical properties of a cured composition prepared from a curable composition containing the (meth)acrylate-functionalized oligomer. Typically, however, the (meth)acrylate-functionalized oligomer has a number average molecular weight of at least 3000, at least 4000 or at least 5000 daltons but not greater than 30,000 daltons, not greater than 20,000 daltons, not greater than 18,000 daltons, or not greater than 15,000 daltons. For example, the number average molecular weight of the (meth)acrylate-functionalized oligomer may be 2000 daltons to 30,000 daltons, 3000 daltons to 20,000 daltons or 4000 daltons to 15,000 daltons.

The (meth)acrylate-functionalized oligomer may have a linear structure, but in other embodiments of the invention may have a star, radial or branched structure. According to certain aspects of the invention, a (meth)acrylate functional group is present at each end (terminus) of the (meth)acrylate-functionalized oligomer. A (meth)acrylate-functionalized oligomer in accordance with the invention may contain a single (meth)acrylate functional group per molecule, but preferably contains two or more (meth)acrylate functional groups per molecule. For example, the (meth)acrylate-functionalized oligomer may contain two, three, four, five or six (meth)acrylate functional groups per molecule. According to certain embodiments, the (meth)acrylate-functionalized oligomer does not contain any ethylenically unsaturated functional groups other than the (meth)acrylate functional groups.

(Meth)acrylate-functionalized oligomers in accordance with the present invention may be prepared using the segment precursors, polyisocyanates, (meth)acrylate-functionalized end group precursors, and synthetic methods described in more detail as follows.

Segment Precursors

The (meth)acrylate-functionalized oligomers of the present invention contain an oligomeric backbone comprised of first segments and second segments wherein the first segments are residues of a first segment precursor which has a number average molecular weight of at least 250 daltons and contains a plurality of repeating units and a plurality of isocyanate-reactive functional groups and the second segments are residues of a second segment precursor, different from the first segment precursor, which has a number average molecular weight of at least 250 daltons and which contains a plurality of repeating units and a plurality of isocyanate-reactive functional groups, wherein a Hansen Solubility Parameter Distance Relative Energy Difference between the first segment and the second segment is at least about 4 and not more than about 9.

According to certain embodiments, one or both of the first segment precursor and the second segment precursor contain two isocyanate-reactive functional groups per molecule. Typically, the isocyanate-reactive functional groups are at terminal ends of the first and second segment precursors. Suitable isocyanate-reactive functional groups include hydroxyl (—OH) groups, including primary, secondary and tertiary hydroxyl groups, thiol (—SH), including primary, secondary and tertiary thiol groups, and primary and secondary amino groups (—NH$_2$ or —NHR, where R can be, for example, an organic substituent such as an alkyl group).

The repeating units present in the first segment precursor and second segment precursor may be of any known type, including for example oxyalkylene, carbonate and ester repeating units. The repeating units within a particular segment precursor may be identical to or different from each other (i.e., the repeating units may be the same or may comprise two or more different repeating units, such as both oxyethylene and oxypropylene repeating units in the case where the segment precursor is a polyether polyol).

The number of repeating units within a segment precursor may be varied as needed to achieve a desired or target number average molecular weight for the segment precursor and the corresponding segment obtained in the resulting (meth)acrylate-functionalized oligomer. The segment precursors should have number average molecular weights of at least 250 daltons. In other embodiments, the segment precursors have number average molecular weights of at least 300 daltons, at least 350 daltons or at least 400 daltons. Generally speaking, it is preferred for the number average molecular weights of the segment precursors to be not greater than 5000 daltons. According to other embodiments, the number average molecular weights of the segment precursors are not greater than 4500 daltons or not greater than 4000 daltons. For example, the first and second segment precursors may have number average molecular weights of 250 to 5000 daltons, 300 to 4500 daltons, or 350 to 4000 daltons.

As previously mentioned, the first segment precursor and second segment precursor may differ from each other not only compositionally, but also with respect to their number average molecular weights. According to one embodiment of the invention, the first segment precursor has a number average molecular weight which is at least 1000 daltons different from the number average molecular weight of the second segment precursor.

The first segment precursor and the second segment precursor should be selected such that when incorporated into the (meth)acrylate-functionalized oligomer, the first segment and the second segment exhibit a Hansen Solubility Parameter Distance Relative Energy Difference of at least about 4 and not more than about 9. For example, the Hansen Solubility Parameter Distance Relative Energy Difference between the first segment and the second segment may be at least 4 and not more than 8.5.

Hansen solubility parameters consist of three parameters representing forces acting between molecules of a substance (dispersion forces, polar intermediate forces, and hydrogen bonding forces and can be calculated according to the approach proposed by Charles Hansen in the work with the title "Hansen Solubility Parameters: A User's Handbook," Second Edition (2007) Boca Raton, Fla.: CRC Press. ISBN 978-O-8493-7248-3. According to this approach, three parameters, called "Hansen parameters": $\delta_d$, $\delta_p$, and $\delta_h$, are sufficient for predicting the behavior of a solvent with respect to a given molecule. The parameter $\delta_d$, in MPa$^{1/2}$, quantifies the energy of the forces of dispersion between the molecules, i.e., the van der Waals forces. The parameter $\delta_p$, in MPa$^{1/2}$, represents the energy of the intermolecular dipolar interactions. Finally, the parameter $\delta h$, in MPa$^{1/2}$, quantifies the energy derived from the intermolecular hydrogen bonds, i.e., the capacity to interact via a hydrogen bond. The sum of the squares of the three parameters corresponds to the square of the Hildebrand solubility parameter ($\delta_{tot}$).

The three Hansen solubility parameters define a three-dimensional Hansen space. The three Hansen solubility parameters of a material are coordinates in the Hansen space. Thus, the Hansen solubility parameters of a material determine the relative position of the material in the Hansen space. The Hansen solubility parameters of a mixture of a plurality of components are a volume-weighted combination of the Hansen solubility parameters of the individual components making up the mixture. Thus, a mixture of a plurality of components also has a relative position in Hansen space. A Hansen Solubility Parameter Distance (Ra) is a distance in Hansen space between any two materials. The Ra may be determined from Equation 1 below:

$$Ra = \sqrt{4(\delta_{d2}-\delta_{d1})^2 + (\delta_{p2}-\delta_{p1})^2 + (\delta_{h2}-\delta_{h1})^2} \quad \text{(Equation 1)}$$

wherein $\delta_{d1}$, $\delta_{p1}$, and $\delta_{h1}$ are the dispersion, polar, and hydrogen bonding Hansen solubility parameters, respectively, of one of the two components and $\delta_{d2}$, $\delta_{p2}$, and $\delta_{h2}$ are the dispersion, polar, and hydrogen bonding Hansen solubility parameters, respectively, of the other of the two components. The values of the Hansen solubility parameters for a particular component may be determined empirically or may be found in published tables.

Polymeric polyols are particularly suitable for use as segment precursors in the present invention. As used herein, the term "polymeric polyol" means a polymer bearing two or more isocyanate-reactive hydroxyl groups per molecule. Preferably, the hydroxyl groups are primary and/or secondary hydroxyl groups. The hydroxyl groups, according to certain embodiments, may be positioned at terminal ends of the polymer. However, it is also possible for hydroxyl groups to be present along the backbone of the polymer or on side chains or groups pendant to the polymer backbone. According to one preferred embodiment, the polymeric polyol may contain two isocyanate-reactive hydroxyl groups per molecule (i.e., a polymeric diol). The polymer portion of the polymeric polyol may be comprised of a plurality of repeating units such as oxyalkylene units, ester units, carbonate units, acrylic units, alkylene units or the like or combinations thereof.

According to certain embodiments of the invention, the polymeric polyol may be represented by the following Formula (III):

HO-[Polymer]-OH          (III)

wherein [Polymer] is a polyoxyalkylene, polycarbonate or polyester chain.

Particularly preferred polymeric polyols include polyether polyols and polyester polyols. Suitable polyether polyols include, for example, polytetramethylene glycols (hydroxyl-functionalized polymers of tetrahydrofuran) and polyethylene glycols (hydroxyl-functionalized polymers of ethylene oxide). Suitable polyester polyols include, for example, poly(caprolactones), poly(lactides), poly(alkylene glycol adipates) and poly(alkylene glycol succinates).

Other types of polymeric polyols potentially useful in the present invention include polycarbonate polyols, polydiene polyols (e.g., polybutadiene diols, including fully or partially hydrogenated polydiene polyols) and polyacrylic polyols.

The molecular weight of the polymeric polyol may be varied as may be needed or desired in order to achieve particular properties in the (meth)acrylate-functionalized urethane oligomer prepared therefrom and/or in the curable composition containing the (meth)acrylate-functionalized urethane oligomer and/or the cured composition obtained by curing the curable composition. For example, the number average molecular weight of the polymeric polyol may be at least 300, at least 350, or at least 400 daltons. In other embodiments, the polymeric polyol may have a number average molecular weight of 5000 daltons or less, 4500 daltons or less, or 4000 daltons or less. For example, the polymeric polyol may have a number average molecular weight of 250 to 5000 daltons, 300 to 4500 daltons or 350 to 4000 daltons.

Polyisocyanates

To prepare (meth)acrylate-functionalized oligomers in accordance with the present invention, a polyisocyanate or a mixture of different polyisocyanates may be utilized. As used herein, the term "polyisocyanate" means an organic compound containing two or more isocyanate (—NCO) functional groups per molecule. According to a preferred embodiment, the polyisocyanate is a diisocyanate. In other preferred embodiments, the polyisocyanate is an aliphatic polyisocyanate (including cycloaliphatic polyisocyanates) or an aromatic polyisocyanate.

According to certain embodiments of the invention, the polyisocyanate is a diisocyanate which may be represented by the following Formula (IV):

OCN—R—NCO          (IV)

wherein R is a divalent organic moiety, such as a divalent hydrocarbyl moiety.

Illustrative examples of suitable polyisocyanates include, without limitation, isophorone diisocyanate (IPDI), toluene diisocyanate (TDI), dicyclohexylmethane 4,4'-diisocyanate (also referred to as methylene dicyclohexyl diisocyanate or hydrogenated MDI (HMDI)), hexamethylene diisocyanate (1,6-hexane diisocyanate), 4,4'-methylenebis(phenylisocyanate), xylenediisocyanate, bitolylene diisocyanates (0-tolidine diisocyanates), 1,5-naphthylene diisocyanate, naphthalene diisocyanates, dianisidine diisocyanates, and polymethylene polyphenylisocyanates, including oligomers thereof. Examples of preferred polyisocyanates include toluene diisocyanates (e.g., 2,4-toluene diisocyanate and 2,6-toluene diisocyanate), isophorone diisocyanate (IPDI), trimethylhexamethylene diisocyanates (e.g., 2,2,4-trimethylhexamethylene diisocyanate and 2,4,4-trimethylhexamethylene diisocyanate), xylylene diisocyanate (1,3-diisocyanatomethyl benzene), hydrogenated xylylene diisocyanate (sometimes referred to as 1,3-diisocyanatomethyl cyclohexane), methylene bis(4-isocyanato cyclohexane) (sometimes referred to as hydrogenated MDI or methylene-bis-cyclohexane diisocyanate) and combinations thereof.

Precursors for (Meth)Acrylate-Functionalized End Groups

The (meth)acrylate-functionalized end groups on the (meth)acrylate-functionalized oligomer may be formed or derived from isocyanate-reactive (meth)acrylate-functionalized compounds. The isocyanate-reactive (meth)acrylate-functionalized compounds thus may be considered precursors of the (meth)acrylate-functionalized end groups. The isocyanate-reactive (meth)acrylate-functionalized compound contains at least one (and preferably only one) functional group which is reactive with an isocyanate functional group, for example, an isocyanate functional group on a polyisocyanate or an isocyanate functional group on an isocyanate-terminated intermediate oligomer formed by reaction of a polyisocyanate and a first and/or second segment precursor. The isocyanate-reactive functional group may be, for example, a hydroxyl group (yielding a urethane group [—O—C(=O)—NH—] upon reaction with an isocyanate group), a primary or secondary amino group (yielding a urea group [—NR—C(=O)—NH—] upon reaction with an isocyanate group), or a thiol group (yielding a thiourethane group [—S—C(=O)—NH—] upon reaction with an isocyanate group). The isocyanate-reactive (meth)acrylate-functionalized compound additionally contains at least one (and preferably only one) (meth)acrylate functional group.

According to certain aspects of the invention, an isocyanate-reactive (meth)acrylate-functionalized compound is employed which has a structure in accordance with Formula (V):

H—Y—R$^1$—O—C(=O)CR$^2$=CH$_2$          (V)

wherein R$^1$ is a divalent organic moiety, R$^2$ is H or CH$_3$, and Y is O, S or NR$^3$, wherein R$^3$ is H or an alkyl group (e.g., a C1-C10 alkyl group). In certain embodiments, Y is NR$^3$ and R$^3$ is a tertiary alkyl group such as a t-butyl, t-amyl (t-pentyl), or t-hexyl group. Examples of suitable divalent organic moieties (R$^1$) include, for instance, alkylene (e.g., ethylene, propylene (such as —CH$_2$CH(CH$_3$)—), butylene), oligo(oxyalkylene) (e.g., oligo(oxyethylene)), alkoxylated oligo(caprolactone), alkoxylated oligo(lactide), and alkoxylated oligo(caprolactone-co-lactide), as well as possibly oligo(caprolactone), oligo(lactide), and oligo(caprolactone-co-lactide) also.

Thus, according to certain aspects of the invention, the at least one isocyanate-reactive (meth)acrylate-functionalized compound includes or is least one isocyanate-reactive (meth)acrylate-functionalized compound selected from the group consisting of N-alkylaminoalkyl (meth)acrylates; epoxy (meth)acrylates (the reaction products of (meth) acrylic acid and epoxides); hydroxyalkyl(meth)acrylates (such as hydroxyethyl acrylate, hydroxyethyl methacrylate, hydroxypropyl acrylate, hydroxypropyl methacrylate, hydroxybutyl acrylate, hydroxybutyl methacrylate, 1,6-hexanediol mono(meth)acrylate, 1,4-cyclohexanediol mono (meth)acrylate); alkoxylated hydroxyalkyl (meth)acrylates (such as diethylene glycol mono(meth)acrylate, triethylene glycol mono(meth)acrylate); alkoxylated oligo(caprolactone) (meth)acrylates; alkoxylated oligo(lactide) (meth) acrylates; alkoxylated oligo(caprolactone-co-lactide) (meth) acrylates; and combinations thereof. It may also be possible to utilize oligo(caprolactone) (meth)acrylates, oligo(lactide) (meth)acrylates and oligo(caprolactone-co-lactide) (meth) acrylates.

Examples of suitable N-alkylaminoalkyl (meth)acrylates include, without limitation, tert-butylaminoethyl(meth)acrylate; tert-pentylaminoethyl(meth)acrylate; tert-hexylaminoethyl(meth)acrylate; and tert-butylaminopropyl(meth)acrylate.

Reaction of an isocyanate functional group (for example, an isocyanate functional group in the polyisocyanate) with an isocyanate-reactive (meth)acrylate-functionalized compound having a structure in accordance with Formula (V) will lead to the incorporation in the oligomer of a (meth) acrylate-functionalized group having a structure in accordance with Formula (V'):

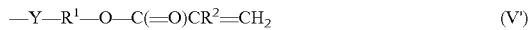

wherein $R^1$ is a divalent organic moiety, $R^2$ is H or $CH_3$, and Y is O or $NR^3$, wherein $R^3$ is H or an alkyl group (e.g., a C1-C10 alkyl group).

The isocyanate-reactive (meth)acrylate-functionalized compound may be a monoester (containing a single (meth) acrylate functional group per molecule) or a multi-functional ester (containing two, three or more (meth)acrylate functional groups per molecule). Examples of suitable multi-functional esters include pentaerythritol tri(meth)acrylate and trimethylolpropane di(meth)acrylate.

According to certain aspects, the isocyanate-reactive (meth)acrylate-functionalized compound is selected such that the resulting urethane, thiourethane or urea group formed in the (meth)acrylate-functionalized urethane oligomer is capable of functioning as a masked or blocked isocyanate group, wherein under certain conditions (e.g., heating at a temperature of 100° C. or greater) the urethane- or urea-forming reaction is reversible. See, for example, U.S. Pat. No. 9,676,963, the teachings of which are incorporated herein by reference in their entirety for all purposes.

Illustrative Methods for Making (Meth)Acrylate-Functionalized Oligomers

Two exemplary methods for preparing (meth)acrylate-functionalized oligomers in accordance with the present invention may be described as follows.

Method 1: A (meth)acrylate-functionalized oligomer in accordance with the invention may be synthesized by a process involving at least the following steps. The resulting (meth)acrylate-functionalized oligomer will have a segmented structure:

a) reacting a first segment precursor which has a number average molecular weight of at least 250 daltons and which contains a plurality of repeating units and a plurality of isocyanate-reactive functional groups with a polyisocyanate to obtain a first isocyanate-terminated intermediate oligomer;

b) reacting the first isocyanate-terminated intermediate oligomer with additional polyisocyanate and a second segment precursor which has a number average molecular weight of at least 250 daltons and which contains a plurality of repeating units and a plurality of isocyanate-reactive functional groups to obtain a second isocyanate-terminated intermediate oligomer; and c) reacting the second isocyanate-terminated intermediate oligomer with a (meth)acrylate compound comprised of an isocyanate-reactive functional group and at least one (meth)acrylate functional group to obtain the (meth)acrylate-functionalized oligomer;

wherein the first segment precursor and second segment precursor are compositionally different from each other and wherein a Hansen Solubility Parameter Distance Relative Energy Difference between the first segment and the second segment is at least 4 and not more than 9.

In step a), a stoichiometric excess of polyisocyanate relative to the isocyanate-reactive functional groups on the first segment precursor is preferably employed. For example, amounts of polyisocyanate and first segment precursor may be utilized that are effective to provide an NCO:OH ratio of about 1.1 to about 1.8. The desired reaction between the isocyanate groups of the polyisocyanate and the isocyanate-reactive functional groups may be promoted through the use of a suitable urethane catalyst (as described in further detail below). The polyisocyanate may be charged to a suitable reaction vessel, and heated to a suitable temperature (e.g., 30° C. to 60° C.) with agitation. If a urethane catalyst is used, it may be charged together with the polyisocyanate or introduced after the polyisocyanate has been heated to the desired temperature, then mixed with the polyisocyanate. The first segment precursor may then be charged to the reaction vessel and combined with the polyisocyanate and optional urethane catalyst, preferably while the contents of the reaction vessel are being mixed. The first segment precursor is preferably added incrementally to the reaction vessel, typically over a period of time of 10 minutes to 2 hours. An exotherm may be observed as a result of the reaction between the polyisocyanate and the first segment precursor. Once the first segment precursor has been added, heating and stirring of the reaction mixture may be continued for a period of time effective to react all of the isocyanate-reactive functional groups of the second segment precursor (typically, about 1 to 10 hours). The temperature of the reaction mixture may, for example, be maintained at a temperature of 60° C. to 110° C. Preferably, step a) is carried out under an atmosphere of an inert (oxygen-free) gas such as nitrogen, with the exclusion of moisture. The reaction mixture may be sparged with an inert gas. Step a) produces a first isocyanate-terminated intermediate oligomer, which generally will have a polyisocyanate residue at each terminal end of the first segment precursor. Typically, at least some chain extension will take place such that two or more molecules of first segment precursor are linked together by residues of the polyisocyanate.

For example, in the case where the polyisocyanate is a diisocyanate and the first segment is a polymeric diol, the first isocyanate-terminated intermediate oligomer may have a structure which can be schematically represented as follows:

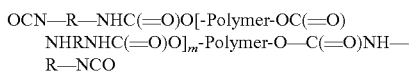

wherein "Polymer" is the polymeric portion of the reacted polymeric diol, R is an organic moiety corresponding to the non-isocyanate portion of the diisocyanate, and m is an integer of 1 or more, the isocyanate-terminated intermediate oligomer containing both only segments derived from the first segment precursor (i.e., segments derived from the second segment precursor are not present).

Following step a), the first isocyanate-terminated intermediate oligomer is reacted in step b) with the second segment precursor. The second segment precursor may be added incrementally to the reaction mixture containing the first isocyanate-terminated oligomer over a period of time (e.g., 0.5 hours to 3 hours) while mixing and heating the reaction mixture. Heating of the reaction mixture is continued following completion of the addition of the second segment precursor for a period of time and a temperature effective to attain complete reaction of the isocyanate-reactive functional groups of the second segment precursor with isocyanate groups on the first isocyanate-terminated intermediate oligomer, thereby producing a reaction mixture containing the second isocyanate-terminated intermediate oligomer. Generally speaking, suitable reaction temperatures include the range of 60° C. to 110° C. and suitable reaction times include the range of 1 to 10 hours (following addition of the second segment precursor). Preferably, step b), like step a), is carried out under an atmosphere of an inert (oxygen-free) gas such as nitrogen, with the exclusion of moisture. The reaction mixture may be sparged with an inert gas.

In step c), the isocyanate groups of the second isocyanate-terminated intermediate oligomer are reacted with the (meth)acrylate compound comprised of an isocyanate-reactive functional group and at least one (meth)acrylate functional group to obtain the (meth)acrylate-functionalized oligomer. Generally speaking, the amount of (meth)acrylate compound preferably is selected to be approximately equivalent, on a molar basis, to the amount of unreacted isocyanate groups. The isocyanate content of the second isocyanate-terminated intermediate oligomer may be measured by any suitable analytical method, such as titration. For example, the ratio of moles of isocyanate-reactive functional groups to moles of isocyanate groups may be from 0.9:1 to 1.2:1. The (meth)acrylate compound may be combined all at once or incrementally to the reaction mixture containing the second isocyanate-terminated intermediate oligomer. Prior to charging the (meth)acrylate, one or more antioxidants or polymerization stabilizers (such as a hindered phenolic antioxidant) may be combined with the reaction mixture. Further, it will generally be desirable to conduct the reaction of the (meth)acrylate compound and the second isocyanate-terminated intermediate oligomer under an oxygen-containing atmosphere, such as an atmosphere of dry air. Before adding the (meth)acrylate compound, the reaction may be sparged with an oxygen-containing gas, with the sparge being maintained during and after the addition. The reaction mixture may be maintained at a temperature and for a time effective to achieve complete or near complete reaction of the isocyanate present. For example, the reaction mixture may be heated at 60° C. to 110° C. for 0.5 to 6 hours.

Method 2: A (meth)acrylate-functionalized oligomer in accordance with the invention may be synthesized by a process involving at least the following steps. The resulting (meth)acrylate-functionalized oligomer will have a statistical structure:

a) reacting a mixture of a first segment precursor which has a number average molecular weight of at least 250 daltons and which contains a plurality of repeating units and a plurality of isocyanate-reactive functional groups and a second segment precursor which has a number average molecular weight of at least 250 daltons and which contains a plurality of repeating units and a plurality of isocyanate-reactive functional groups with a polyisocyanate to obtain an isocyanate-terminated intermediate oligomer; and b) reacting the isocyanate-terminated intermediate oligomer with a (meth)acrylate compound comprised of an isocyanate-reactive functional group and at least one (meth)acrylate functional group to obtain the (meth)acrylate-functionalized oligomer;

wherein the first segment precursor and second segment precursor are compositionally different from each other and wherein a Hansen Solubility Parameter Distance Relative Energy Difference between the first segment and the second segment is at least 4 and not more than 9.

In step a), a stoichiometric excess of polyisocyanate relative to the isocyanate-reactive functional groups on the first and second segment precursors is preferably employed. The NCO:isocyanate-reactive functional group molar ratio may be varied as may be desired to control the degree of chain extension and thus the number average molecular weight of the final (meth)acrylate-functionalized oligomer. For example, amounts of polyisocyanate and first and second segment precursors may be utilized that are effective to provide an NCO:OH ratio of about 1.1 to about 1.8. The desired reaction between the isocyanate groups of the polyisocyanate and the isocyanate-reactive functional groups may be promoted through the use of a suitable urethane catalyst. Such catalysts may be selected from the types of urethane catalysts discussed below. The polyisocyanate, first segment precursor, second segment precursor, and optional urethane catalyst may be charged to a suitable reaction vessel and combined at ambient temperature (e.g., 20° C. to 30° C.) and then heated to a suitable temperature (e.g., 60° C. to 110° C.) with agitation to cause the desired reaction between the isocyanate groups on the polyisocyanate and the isocyanate-reactive functional groups on the first and second segment precursors. Heating and stirring of the reaction mixture may be continued for a period of time effective to react all of the isocyanate-reactive functional groups of the second segment precursor (typically, about 1 to 10 hours). The temperature of the reaction mixture may, for example, be maintained at a temperature of 60° C. to 110° C. Preferably, step a) is carried out under an atmosphere of an inert (oxygen-free) gas such as nitrogen, with the exclusion of moisture. The reaction mixture may be sparged with an inert gas. Step a) produces a isocyanate-terminated intermediate oligomer, which generally will have a polyisocyanate residue at each terminal end of the first segment precursor. Typically, at least some chain extension will take place such that a plurality of molecules of both the first segment precursor and second segment precursor are linked together by residues of the polyisocyanate.

For example, in the case where the polyisocyanate is a diisocyanate and the first segment precursor and second segment precursor are both polymeric diols, the isocyanate-terminated intermediate oligomer may have a structure which can be schematically represented as follows:

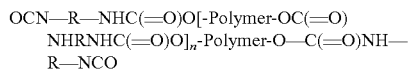

wherein "Polymer" is the polymeric portion of the reacted polymeric diols, R is an organic moiety corresponding to the non-isocyanate portion of the diisocyanate, and n is an integer of 1 or more, the isocyanate-terminated intermediate oligomer containing both one or more segments derived from the first segment precursor and one or more segments derived from the second segment precursor, with the first and second segments being arranged in a statistically random manner relative to each other. It will be recognized that as a result of how reaction products containing such isocyanate-terminated intermediate oligomers are made, the reaction products will be mixtures of oligomers of different chain lengths which have differing numbers of first and second segments within each oligomer molecule.

In step b) of Method 2, the isocyanate groups of the isocyanate-terminated intermediate oligomer are reacted with the (meth)acrylate compound comprised of an isocyanate-reactive functional group and at least one (meth)acrylate functional group to obtain the (meth)acrylate-functionalized oligomer. Generally speaking, the amount of (meth) acrylate compound preferably is selected to be approximately equivalent, on a molar basis, to the amount of unreacted isocyanate groups. The isocyanate content of the second isocyanate-terminated intermediate oligomer may be measured by any suitable analytical method, such as titration. For example, the ratio of moles of isocyanate-reactive functional groups to moles of isocyanate groups may be from 0.9:1 to 1.2:1. The (meth)acrylate compound may be combined all at once or incrementally to the reaction mixture containing the second isocyanate-terminated intermediate oligomer. Prior to charging the (meth)acrylate, one or more antioxidants or polymerization stabilizers (such as a hindered phenolic antioxidant) may be combined with the reaction mixture. Further, it will generally be desirable to conduct the reaction of the (meth)acrylate compound and the second isocyanate-terminated intermediate oligomer under an oxygen-containing atmosphere, such as an atmosphere of dry air. Before adding the (meth)acrylate compound, the reaction may be sparged with an oxygen-containing gas, with the sparge being maintained during and after the addition. The reaction mixture may be maintained at a temperature and for a time effective to achieve complete or near complete reaction of the isocyanate present. For example, the reaction mixture may be heated at 60° C. to 110° C. for 0.5 to 6 hours.

Urethane Catalyst

According to certain embodiments of the invention, one or more urethane catalysts are employed in the preparation of the (meth)acrylate-functionalized oligomer. As used herein, a "urethane catalyst" means a substance which is capable of catalyzing the reaction between an active hydrogen containing group (such as hydroxyl group, thiol group or a primary or secondary amino group) and an isocyanate group to form a urethane linkage (in the case of a hydroxyl group), a thiourethane linkage (in the case of a thiol group) or a urea linkage (in the case of an amino group). Thus, a urethane catalyst may accelerate the rate at which such reaction takes place at a given temperature and/or achieve a target degree of completion of such reaction at a temperature which is lower than the temperature at which the target degree of completion is achieved in the absence of any urethane catalyst.

Any of the tin-based urethane catalysts known in the art may be utilized. However, according to certain preferred embodiments, a non-tin urethane catalyst or a combination of non-tin urethane catalysts is used. In certain embodiments, the intermediate reaction mixture(s) and the resulting product containing (meth)acrylate-functionalized oligomer are free or substantially free of any tin urethane catalyst. For example, the reaction mixture at each stage as well as the final reaction product and the curable composition may comprise less than 500 ppb tin, less than 400 ppb tin, less than 300 ppb tin, less than 200 ppb tin or less than 100 ppb tin.

Suitable non-tin urethane catalysts include, for example, one or more non-tin urethane catalysts selected from the group consisting of carboxylate complexes of bismuth (such as bismuth octoate); acetylacetonate complexes of zirconium; acetylacetonate complexes of hafnium; acetylacetonate complexes of titanium; beta-diketiminate complexes of zirconium; beta-diketiminate complexes of hafnium; beta-diketiminate complexes of titanium; amidinate complexes of zirconium; amidinate complexes of hafnium; amidinate complexes of titanium; carboxylate complexes of zinc; tertiary amines; imidazoles; N-heterocyclic carbenes; tetraalkylammonium (pseudo)halides; phosphines; and combinations thereof.

Typically, a urethane catalyst is utilized in an amount which is from 0.0001 to 0.1 weight %, based on the total weight of the final (meth)acrylate-functionalized oligomer.

Curable Compositions Containing (Meth)Acrylate-Functionalized Oligomers

Although the (meth)acrylate-functionalized oligomers of the present invention may be used by themselves as curable compositions (i.e., compositions capable of being cured to provide polymerized, cured materials), in other aspects of the invention one or more (meth)acrylate-functionalized oligomers in accordance with the invention may be formulated with one or more additives (i.e., substance other than the inventive (meth)acrylate-functionalized oligomers) to provide curable compositions. Such additives may include, for example, reactive diluents, oligomers (especially (meth)acylate-functionalized oligomers) other than (meth)acrylate-functionalized oligomers in accordance with the present invention, stabilizers, initiators (including photoinitiators), fillers, pigments and the like and combinations thereof. Any of the additives known or used in the curable (meth)acrylate resin art may also be employed in connection with the (meth)acrylate-functionalized oligomers of the present invention to formulate curable compositions useful for a wide variety of end use applications. Certain of such additives are discussed in more detail below.

Additional Reactive Components

Curable compositions may be formulated to include one or more additional components capable of reacting with the (meth)acrylate-functionalized oligomers which are in accordance with the present invention. That is, such additional components become covalently bonded into the polymeric matrix formed upon curing of the curable composition. Such additional reactive components typically contain one or more ethylenically unsaturated functional groups per molecule, in particular one or more (meth)acrylate functional groups per molecule. The additional reactive components may be monomeric or oligomeric in character, as described below in more detail.

The relative amounts of (meth)acrylate-functionalized oligomer(s) in accordance with the present invention and additional reactive components (such as other (meth)acrylate-functionalized compounds) in the curable composition is not considered to be critical and may be varied widely, depending upon the particular components selected for use and the properties sought in the curable composition and the cured composition obtained therefrom. For example, the curable composition may be comprised of 0.5 to 99.5% by weight (meth)acrylate-functionalized oligomer in accordance with the present invention and 0.5 to 99.5% by weight additional reactive components, based on the total weight of (meth)acrylate-functionalized oligomer in accordance with the invention and additional reactive components.

Suitable (meth)acrylate-functionalized compounds include both (meth)acrylate-functionalized monomers and (meth)acrylate-functionalized oligomers.

According to certain embodiments of the invention, the curable composition comprises, in addition to at least one (meth)acrylate-functionalized oligomer in accordance with the invention, at least one (meth)acrylate-functionalized monomer containing two or more (meth)acrylate functional groups per molecule. Examples of useful (meth)acrylate-functionalized monomers containing two or more (meth) acrylate functional groups per molecule include acrylate and methacrylate esters of polyhydric alcohols (organic compounds containing two or more, e.g., 2 to 6, hydroxyl groups per molecule). Specific examples of suitable polyhydric alcohols include $C_{2-20}$ alkylene glycols (glycols having a $C_{2-10}$ alkylene group may be preferred, in which the carbon chain may be branched; e.g., ethylene glycol, trimethylene glycol, 1,2-propylene glycol, 1,2-butanediol, 1,3-butanediol, 2,3-butanediol, tetramethylene glycol (1,4-butanediol), 1,5-pentanediol, 1,6-hexanediol, 1,8-octanediol, 1,9-nonanediol, 1,12-dodecanediol, cyclohexane-1,4-dimethanol, bisphenols, and hydrogenated bisphenols, as well as alkoxylated (e.g., ethoxylated and/or propoxylated) derivatives thereof, wherein for example from 1 to 20 moles of an alkylene oxide such as ethylene oxide and/or propylene oxide has been reacted with 1 mole of glycol), diethylene glycol, glycerin, alkoxylated glycerin, triethylene glycol, dipropylene glycol, tripropylene glycol, trimethylolpropane, alkoxylated trimethylolpropane, ditrimethylolpropane, alkoxylated ditrimethylolpropane, pentaerythritol, alkoxylated pentaerythritol, dipentaerythritol, alkoxylated dipentaerythritol, cyclohexanediol, alkoxylated cyclohexanediol, cyclohexanedimethanol, alkoxylated cyclohexanedimethanol, norbornene dimethanol, alkoxylated norbornene dimethanol, norbornane dimethanol, alkoxylated norbornane dimethanol, polyols containing an aromatic ring, cyclohexane-1,4-dimethanol ethylene oxide adducts, bis-phenol ethylene oxide adducts, hydrogenated bisphenol ethylene oxide adducts, bisphenol propylene oxide adducts, hydrogenated bisphenol propylene oxide adducts, cyclohexane-1, 4-dimethanol propylene oxide adducts, sugar alcohols and alkoxylated sugar alcohols. Such polyhydric alcohols may be fully or partially esterified (with (meth)acrylic acid, (meth)acrylic anhydride, (meth)acryloyl chloride or the like), provided they contain at least two (meth)acrylate functional groups per molecule. As used herein, the term "alkoxylated" refers to compounds in which one or more epoxides such as ethylene oxide and/or propylene oxide have been reacted with active hydrogen-containing groups (e.g., hydroxyl groups) of a base compound, such as a polyhydric alcohol, to form one or more oxyalkylene moieties. For example, from 1 to 25 moles of epoxide may be reacted per mole of base compound. According to certain aspects of the invention, the (meth)acrylate-functionalized monomer(s) used may be relatively low in molecular weight (e.g., 100 to 1000 daltons).

Any of the (meth)acrylate-functionalized oligomers known in the art may also be used in curable compositions of the present invention, provided the curable composition contains at least one (meth)acrylate-functionalized oligomer that is in accordance with the invention. According to certain embodiments, such oligomers contain two or more (meth) acrylate functional groups per molecule. The number average molecular weight of such oligomers may vary widely, e.g., from about 500 to about 50,000.

Suitable (meth)acrylate-functionalized oligomers include, for example, polyester (meth)acrylate oligomers, epoxy (meth)acrylate oligomers, polyether (meth)acrylate oligomers, polyurethane (meth)acrylate oligomers, acrylic (meth) acrylate oligomers, polydiene (meth)acrylate oligomers, polycarbonate (meth)acrylate oligomers and combinations thereof. Such oligomers may be selected and used in combination with one or more (meth)acrylate-functionalized monomers in order to enhance the flexibility, strength and/or modulus, among other attributes, of a cured resin foam prepared using the multi-component system of the present invention.

Exemplary polyester (meth)acrylate oligomers include the reaction products of acrylic or methacrylic acid or mixtures thereof with hydroxyl group-terminated polyester polyols. The reaction process may be conducted such that all or essentially all of the hydroxyl groups of the polyester polyol have been (meth)acrylated, particularly in cases where the polyester polyol is difunctional. The polyester polyols can be made by polycondensation reactions of polyhydroxyl functional components (in particular, diols) and polycarboxylic acid functional compounds (in particular, dicarboxylic acids and anhydrides). The polyhydroxyl functional and polycarboxylic acid functional components can each have linear, branched, cycloaliphatic or aromatic structures and can be used individually or as mixtures.

Examples of suitable epoxy (meth)acrylate oligomers include the reaction products of acrylic or methacrylic acid or mixtures thereof with glycidyl ethers or esters.

Suitable polyether (meth)acrylate oligomers include, but are not limited to, the condensation reaction products of acrylic or methacrylic acid or mixtures thereof with polyetherols which are polyether polyols (such as polyethylene glycol, polypropylene glycol or polytetramethylene glycol). Suitable polyetherols can be linear or branched substances containing ether bonds and terminal hydroxyl groups. Polyetherols can be prepared by ring opening polymerization of cyclic ethers such as tetrahydrofuran or alkylene oxides with a starter molecule. Suitable starter molecules include water, polyhydroxyl functional materials, polyester polyols and amines.

Polyurethane (meth)acrylate oligomers (sometimes also referred to as "urethane (meth)acrylate oligomers") capable of being used in the multi-component systems of the present invention include urethanes based on aliphatic and/or aromatic polyester polyols and polyether polyols and aliphatic and/or aromatic polyester diisocyanates and polyether diisocyanates capped with (meth)acrylate end-groups. Suitable polyurethane (meth)acrylate oligomers include, for example, aliphatic polyester-based urethane di- and tetra-acrylate oligomers, aliphatic polyether-based urethane di- and tetra-acrylate oligomers, as well as aliphatic polyester/polyether-based urethane di- and tetra-acrylate oligomers.

In various embodiments, the polyurethane (meth)acrylate oligomers may be prepared by reacting aliphatic and/or aromatic diisocyanates with OH group terminated polyester polyols (including aromatic, aliphatic and mixed aliphatic/aromatic polyester polyols), polyether polyols, polycarbonate polyols, polycaprolactone polyols, polyorganosiloxane polyols (e.g., polydimethylsiloxane polyols), or polydiene polyols (e.g., polybutadiene polyols), or combinations thereof to form isocyanate-functionalized oligomers which are then reacted with hydroxyl-functionalized (meth)acrylates such as hydroxyethyl acrylate or hydroxyethyl methacrylate to provide terminal (meth)acrylate groups. For example, the polyurethane (meth)acrylate oligomers may contain two, three, four or more (meth)acrylate functional groups per molecule.

Suitable acrylic (meth)acrylate oligomers (sometimes also referred to in the art as "acrylic oligomers") include oligomers which may be described as substances having an oligomeric acrylic backbone which is functionalized with one or (meth)acrylate groups (which may be at a terminus of the oligomer or pendant to the acrylic backbone). The acrylic backbone may be a homopolymer, random copolymer or block copolymer comprised of repeating units of acrylic monomers. The acrylic monomers may be any monomeric (meth)acrylate such as C1-C6 alkyl (meth)acrylates as well as functionalized (meth)acrylates such as (meth)acrylates bearing hydroxyl, carboxylic acid and/or epoxy groups. Acrylic (meth)acrylate oligomers may be prepared using any procedures known in the art, such as by oligomerizing monomers, at least a portion of which are functionalized with hydroxyl, carboxylic acid and/or epoxy groups (e.g., hydroxyalkyl(meth)acrylates, (meth)acrylic acid, glycidyl (meth)acrylate) to obtain a functionalized oligomer intermediate, which is then reacted with one or more (meth)acrylate-containing reactants to introduce the desired (meth)acrylate functional groups.

Exemplary (meth)acrylate-functionalized monomers and oligomers may include ethoxylated bisphenol A di(meth) acrylates; triethylene glycol di(meth)acrylate; ethylene glycol di(meth)acrylate; tetraethylene glycol di(meth)acrylate; polyethylene glycol di(meth)acrylates; 1,4-butanediol diacrylate; 1,4-butanediol dimethacrylate; diethylene glycol diacrylate; diethylene glycol dimethacrylate, 1,6-hexanediol diacrylate; 1,6-hexanediol dimethacrylate; neopentyl glycol diacrylate; neopentyl glycol di(meth)acrylate; polyethylene glycol (600) dimethacrylate (where 600 refers to the approximate number average molecular weight of the polyethylene glycol portion); polyethylene glycol (200) diacrylate; 1,12-dodecanediol dimethacrylate; tetraethylene glycol diacrylate; triethylene glycol diacrylate, 1,3-butylene glycol dimethacrylate, tripropylene glycol diacrylate, polybutadiene diacrylate; methyl pentanediol diacrylate; polyethylene glycol (400) diacrylate; ethoxylated$_2$ bisphenol A dimethacrylate; ethoxylated$_3$ bisphenol A dimethacrylate; ethoxylated$_3$ bisphenol A diacrylate; cyclohexane dimethanol dimethacrylate; cyclohexane dimethanol diacrylate; ethoxylated$_{10}$ bisphenol A dimethacrylate (where the numeral following "ethoxylated" is the average number of oxyalkylene moieties per molecule); dipropylene glycol diacrylate; ethoxylated$_4$ bisphenol A dimethacrylate; ethoxylated$_6$ bisphenol A dimethacrylate; ethoxylated$_8$ bisphenol A dimethacrylate; alkoxylated hexanediol diacrylates; alkoxylated cyclohexane dimethanol diacrylate; dodecane diacrylate; ethoxylated$_4$ bisphenol A diacrylate; ethoxylated$_{10}$ bisphenol A diacrylate; polyethylene glycol (400) dimethacrylate; polypropylene glycol (400) dimethacrylate; metallic diacrylates; modified metallic diacrylates; metallic dimethacrylates; polyethylene glycol (1000) dimethacrylate; methacrylated polybutadiene; propoxylated$_2$ neopentyl glycol diacrylate; ethoxylated$_{30}$ bisphenol A dimethacrylate; ethoxylated$_{30}$ bisphenol A diacrylate; alkoxylated neopentyl glycol diacrylates; polyethylene glycol dimethacrylates; 1,3-butylene glycol diacrylate; ethoxylated$_2$ bisphenol A dimethacrylate; dipropylene glycol diacrylate; ethoxylated$_4$ bisphenol A diacrylate; polyethylene glycol (600) diacrylate; polyethylene glycol (1000) dimethacrylate; tricyclodecane dimethanol diacrylate; propoxylated$_2$ neopentyl glycol diacrylate; diacrylates of alkoxylated aliphatic alcohols trimethylolpropane trimethacrylate; trimethylolpropane triacrylate; tris (2-hydroxyethyl) isocyanurate triacrylate; ethoxylated$_{20}$ trimethylolpropane triacrylate; pentaerythritol triacrylate; ethoxylated$_3$ trimethylolpropane triacrylate; propoxylated$_3$ trimethylolpropane triacrylate; ethoxylated$_6$ trimethylolpropane triacrylate; propoxylated$_6$ trimethylolpropane triacrylate; ethoxylated$_9$ trimethylolpropane triacrylate; alkoxylated trifunctional acrylate esters; trifunctional methacrylate esters; trifunctional acrylate esters; propoxylated$_3$ glyceryl triacrylate; propoxylated$_{5.5}$ glyceryl triacrylate; ethoxylated$_{15}$ trimethylolpropane triacrylate; trifunctional phosphoric acid esters; trifunctional acrylic acid esters; pentaerythritol tetraacrylate; di-trimethylolpropane tetraacrylate; ethoxylated$_4$ pentaerythritol tetraacrylate; pentaerythrilol polyoxyethylene tetraacrylate; dipentaerythritol pentaacrylate; pentaacrylate esters; epoxy acrylate oligomers; epoxy methacrylate oligomers; urethane acrylate oligomers; urethane methacrylate oligomers; polyester acrylate oligomers; polyester methacrylate oligomers; stearyl methacrylate oligomer; acrylic acrylate oligomers; perfluorinated acrylate oligomers; perfluorinated methacrylate oligomers; amino acrylate oligomers; amine-modified polyether acrylate oligomers; and amino methacrylate oligomers.

The curable compositions of the present invention may optionally comprise one or more (meth)acrylate-functionalized compounds containing a single acrylate or methacrylate functional group per molecule (referred to herein as "mono (meth)acrylate-functionalized compounds"). Any of such compounds known in the art may be used.

Examples of suitable mono(meth)acrylate-functionalized compounds include, but are not limited to, mono-(meth) acrylate esters of aliphatic alcohols (wherein the aliphatic alcohol may be straight chain, branched or alicyclic and may be a mono-alcohol, a di-alcohol or a polyalcohol, provided only one hydroxyl group is esterified with (meth)acrylic acid); mono-(meth)acrylate esters of aromatic alcohols (such as phenols, including alkylated phenols); mono-(meth) acrylate esters of alkylaryl alcohols (such as benzyl alcohol); mono-(meth)acrylate esters of oligomeric and polymeric glycols such as diethylene glycol, triethylene glycol, dipropylene glycol, tripropylene glycol, polyethylene glycol, and polypropylene glycol); mono-(meth)acrylate esters of monoalkyl ethers of glycols, oligomeric glycols, polymeric glycols; mono-(meth)acrylate esters of alkoxylated (e.g., ethoxylated and/or propoxylated) aliphatic alcohols (wherein the aliphatic alcohol may be straight chain, branched or alicyclic and may be a mono-alcohol, a di-alcohol or a polyalcohol, provided only one hydroxyl group of the alkoxylated aliphatic alcohol is esterified with (meth) acrylic acid); mono-(meth)acrylate esters of alkoxylated (e.g., ethoxylated and/or propoxylated) aromatic alcohols (such as alkoxylated phenols); caprolactone mono(meth) acrylates; and the like.

The following compounds are specific examples of mono (meth)acrylate-functionalized compounds suitable for use in the curable compositions of the present invention: methyl (meth)acrylate; ethyl (meth)acrylate; n-propyl (meth)acrylate; n-butyl (meth)acrylate; isobutyl (meth)acrylate; n-hexyl (meth)acrylate; 2-ethylhexyl (meth)acrylate; n-octyl (meth)acrylate; isooctyl (meth)acrylate; n-decyl (meth)acrylate; n-dodecyl (meth)acrylate; tridecyl (meth)acrylate; tetradecyl (meth)acrylate; hexadecyl (meth)acrylate; 2-hydroxyethyl (meth)acrylate; 2- and 3-hydroxypropyl (meth) acrylate; 2-methoxyethyl (meth)acrylate; 2-ethoxyethyl (meth)acrylate; 2- and 3-ethoxypropyl (meth)acrylate; tetrahydrofurfuryl (meth)acrylate; alkoxylated tetrahydrofurfuryl (meth)acrylate; isobornyl (meth)acrylate; 2-(2-ethoxyethoxy)ethyl (meth)acrylate; cyclohexyl (meth)acrylate; glycidyl (meth)acrylate; isodecyl (meth)acrylate: 2-phenoxyethyl (meth)acrylate: lauryl (meth)acrylate; isobornyl (meth)acrylate; 2-phenoxyethyl (meth)acrylate; alkoxylated phenol (meth)acrylates; alkoxylated nonylphenol (meth)acrylates; cyclic trimethylolpropane formal (meth)acrylate; trimethylcyclohexanol (meth)acrylate; diethylene glycol monomethyl ether (meth)acrylate; diethylene glycol monoethyl ether (meth)acrylate; diethylene glycol monobutyl ether (meth)acrylate; triethylene glycol monoethyl ether (meth)acrylate; ethoxylated lauryl (meth)acrylate; methoxy polyethylene glycol (meth)acrylates; and combinations thereof.

According to certain desirable embodiments of the invention, the curable composition comprises at least one (meth)acrylate-functionalized compound which functions as a hydrogen-bonding donor, such as compounds containing at least one hydroxyl or amino functional group in addition to the (meth)acrylate functional group(s).

Stabilizer

Generally speaking, it will be desirable to include one or more stabilizers in the curable compositions of the present invention in order to provide adequate storage stability and shelf life. Advantageously, one or more such stabilizers are present at each stage of the method used to prepare the curable composition, to protect against unwanted reactions of the (meth)acrylate functional groups of the reactive diluents and isocyanate-reactive (meth)acrylate functionalized compound(s) during processing. As used herein, the term "stabilizer" means a compound or substance which retards or prevents reaction or curing of (meth)acrylate functional groups present in a composition in the absence of actinic radiation. However, it will be advantageous to select an amount and type of stabilizer such that the composition remains capable of being cured when exposed to actinic radiation (that is, the stabilizer does not prevent radiation curing of the composition). Typically, effective stabilizers for purposes of the present invention will be classified as free radical stabilizers (i.e., stabilizers which function by inhibiting free radical reactions).

Any of the stabilizers known in the art related to (meth)acrylate-functionalized compounds may be utilized in the present invention. Quinones represent a particularly preferred type of stabilizer which can be employed in the context of the present invention. As used herein, the term "quinone" includes both quinones and hydroquinones as well as ethers thereof such as monoalkyl, monoaryl, monoaralkyl and bis(hydroxyalkyl) ethers of hydroquinones. Hydroquinone monomethyl ether is an example of a suitable stabilizer which can be utilized.

The concentration of stabilizer in the curable composition will vary depending upon the particular stabilizer or combination of stabilizers selected for use and also on the degree of stabilization desired and the susceptibility of components in the curable compositions towards degradation in the absence of stabilizer. Typically, however, the curable composition is formulated to comprise from 50 to 5000 ppm stabilizer. According to certain embodiments of the invention, the reaction mixture during each stage of the method employed to make the curable composition contains at least some stabilizer, e.g., at least 50 ppm stabilizer.

Photoinitiator

In certain embodiments of the invention, the curable compositions described herein include at least one photoinitiator and are curable with radiant energy. A photoinitiator may be considered any type of substance that, upon exposure to radiation (e.g., actinic radiation), forms species that initiate the reaction and curing of polymerizing organic substances present in the curable composition. Suitable photoinitiators include both free radical photoinitiators as well as cationic photoinitiators and combinations thereof.

Free radical polymerization initiators are substances that form free radicals when irradiated. The use of free radical photoinitiators is especially preferred. Non-limiting types of free radical photoinitiators suitable for use in the curable compositions of the present invention include, for example, benzoins, benzoin ethers, acetophenones, benzyl, benzyl ketals, anthraquinones, phosphine oxides, α-hydroxyketones, phenylglyoxylates, α-aminoketones, benzophenones, thioxanthones, xanthones, acridine derivatives, phenazene derivatives, quinoxaline derivatives and triazine compounds.

The amount of photoinitiator may be varied as may be appropriate depending upon the photoinitiator(s) selected, the amounts and types of polymerizable species present in the curable composition, the radiation source and the radiation conditions used, among other factors. Typically, however, the amount of photoinitiator may be from 0.05% to 5%, preferably 0.10% to 2% by weight, based on the total weight of the curable composition.

Other Additives

The curable compositions of the present invention may optionally contain one or more additives instead of or in addition to the above-mentioned ingredients. Such additives include, but are not limited to, antioxidants/photostabilizers, light blockers/absorbers, polymerization inhibitors, foam inhibitors, flow or leveling agents, colorants, pigments, dispersants (wetting agents, surfactants), slip additives, fillers, chain transfer agents, thixotropic agents, matting agents, impact modifiers, waxes or other various additives, including any of the additives conventionally utilized in the coating, sealant, adhesive, molding, 3D printing or ink arts.

The curable compositions of the present invention may comprise one or more light blockers (sometimes referred to in the art as absorbers), particularly where the curable composition is to be used as a resin in a three-dimensional printing method involving photocuring of the curable composition. The light blocker(s) may be any such substances known in the three-dimensional printing art, including for example non-reactive pigments and dyes. The light blocker may be a visible light blocker or a UV light blocker, for example. Examples of suitable light blockers include, but are not limited to, titanium dioxide, carbon black and organic ultraviolet light absorbers such as hydroxybenzophenone, hydroxyphenylbenzotriazole, oxanilide, benzophenone, thioxanthone, hydroxyphenyltriazine, Sudan I, bromothymol blue, 2,2'-(2,5-thiophenediyl)bis(5-tert-butylbenzoxazole) (sold under the brand name "Benetex OB Plus") and benzotriazole ultraviolet light absorbers.

The amount of light blocker may be varied as may be desired or appropriate for particular applications. Generally speaking, if the curable composition contains light blocker, it is present in a concentration of from 0.001 to 10% by weight based on the weight of the curable composition.

Advantageously, the curable compositions of the present invention may be formulated to be solvent-free, i.e., free of any non-reactive volatile substances (substances having a boiling point at atmospheric pressure of 150° C. or less). For example, the curable compositions of the present invention may contain little or no non-reactive solvent, e.g., less than 10% or less than 5% or less than 1% or even 0% non-reactive solvent, based on the total weight of the curable composition.

According to certain aspects of the invention, the curable composition may be formulated to include one or more chain extenders. Useful chain extenders include compounds (which may be monomeric, oligomeric or polymeric) bearing two or more isocyanate-reactive functional groups per molecule. Such isocyanate-reactive functional groups may be capable of reacting with the (meth)acrylate-functionalized urethane oligomer component of the curable composition, wherein the reaction may involve reactions at the urethane or urea groups present in the (meth)acrylate-functionalized urethane oligomer and/or the isocyanate groups generated by deblocking of such urethane or urea groups.

Suitable chain extenders include, for example, polyalcohols (e.g., dialcohols), polyamines (e.g., diamines, wherein the amine groups are primary or secondary), and compounds containing one or more hydroxyl groups and one or more primary and/or secondary amino groups per molecule. Examples of such chain extenders include glycols such as ethylene glycol, propylene glycol and neopentyl glycol; glycol oligomers (e.g., oligomers of ethylene glycol such as diethylene glycol, triethylene glycol and tetraethylene glycol)); 1,3-propanediol; 1,3-butanediol; 1,4-butanediol; 1,6-hexanediol; 1,4-cyclohexanediomethanol; ethanolamine; diethanolamine; methyldiethanolamine; phenyldiethanolamine; glycerol; trimethylolpropane; 1,2,6-hexanetriol; triethanolamine; pentaerythritol; N,N,N',N'-tetrakis(2-hydroxypropyl)ethylenediamine; diethyltoluenediamine; dimethylthiotoluenediamine; methylene dicyclohexylamine; hydroquinone bis(2-hydroxyethyl)ether; 4,4'-methylenebis (3-chloro-2,6-diethylaniline; 4,4'-methylenebis(2,6-diethylaniline; 4,4'-methylene bis (2-chloroaniline); and combinations thereof.

Uses for (Meth)Acrylate-Functionalized Oligomers and Curable Compositions Containing (Meth)Acrylate-Functionalized Oligomers As previously mentioned, curable compositions prepared in accordance with the present invention may contain one or more photoinitiators and may be photocurable. In certain other embodiments of the invention, the curable compositions described herein do not include any initiator and are curable (at least in part) with electron beam energy. In other embodiments, the curable compositions described herein include at least one free radical initiator that decomposes when heated or in the presence of an accelerator and are curable chemically (i.e., without having to expose the curable composition to radiation). The at least one free radical initiator that decomposes when heated or in the presence of an accelerator may, for example, comprise a peroxide or azo compound. Suitable peroxides for this purpose may include any compound, in particular any organic compound, that contains at least one peroxy (—O—O—) moiety, such as, for example, dialkyl, diaryl and aryl/alkyl peroxides, hydroperoxides, percarbonates, peresters, peracids, acyl peroxides and the like. The at least one accelerator may comprise, for example, at least one tertiary amine and/or one or more other reducing agents based on metal-containing salts (such as, for example, carboxylate salts of transition metals such as iron, cobalt, manganese, vanadium and the like and combinations thereof). The accelerator(s) may be selected so as to promote the decomposition of the free radical initiator at room or ambient temperature to generate active free radical species, such that curing of the curable composition is achieved without having to heat or bake the curable composition. In other embodiments, no accelerator is present and the curable composition is heated to a temperature effective to cause decomposition of the free radical initiator and to generate free radical species which initiate curing of the polymerizable compound(s) present in the curable composition.

Advantageously, the curable compositions of the present invention may be formulated to be solvent-free, i.e., free of any non-reactive volatile substances (substances having a boiling point at atmospheric pressure of 150° C. or less). For example, the curable compositions of the present invention may contain little or no non-reactive solvent, e.g., less than 10% or less than 5% or less than 1% or even 0% non-reactive solvent, based on the total weight of the curable composition. If reactive diluents are utilized in the curable composition, they may be selected so as to render the curable composition sufficiently low in viscosity, even without solvent being present, that the curable composition can be easily applied at a suitable application temperature to a substrate surface so as to form a relatively thin, uniform layer.

In preferred embodiments of the invention, the curable composition is a liquid at 25° C. In various embodiments of the invention, the curable compositions described herein are formulated to have a viscosity of less than 10,000 mPa·s (cP), or less than 5000 mPa·s (cP), or less than 4000 mPa·s (cP), or less than 3000 mPa·s (cP), or less than 2500 mPa·s (cP), or less than 2000 mPa·s (cP), or less than 1500 mPa·s (cP), or less than 1000 mPa·s (cP) or even less than 500 mPa·s (cP) as measured at 25° C. using a Brookfield viscometer, model DV-II, using a 27 spindle (with the spindle speed varying typically between 20 and 200 rpm, depending on viscosity). In advantageous embodiments of the invention, the viscosity of the curable composition is from 200 to 5000 mPa·s (cP), or from 200 to 2000 mPa·s (cP), or from 200 to 1500 mPa·s (cP), or from 200 to 1000 mPa·s (cP) at 25° C. Relatively high viscosities can provide satisfactory performance in applications where the curable composition is heated above 25° C., such as in three-dimensional printing operations or the like which employ machines having heated resin vats.

The curable compositions described herein may be compositions that are to be subjected to curing by means of free radical polymerization, cationic polymerization or other types of polymerization. In particular embodiments, the curable compositions are photocured (i.e., cured by exposure to actinic radiation such as light, in particular visible or UV light). End use applications for the curable compositions include, but are not limited to, inks, coatings, adhesives, additive manufacturing resins (such as 3D printing resins), molding resins, sealants, composites, antistatic layers, electronic applications, recyclable materials, smart materials capable of detecting and responding to stimuli, and biomedical materials.

Cured compositions prepared from curable compositions as described herein may be used, for example, in three-dimensional articles (wherein the three-dimensional article may consist essentially of or consist of the cured composition), coated articles (wherein a substrate is coated with one or more layers of the cured composition, including encapsulated articles in which a substrate is completely encased by the cured composition), laminated or adhered articles (wherein a first component of the article is laminated or adhered to a second component by means of the cured composition), composite articles or printed articles (wherein graphics or the like are imprinted on a substrate, such as a paper, plastic or M-containing substrate, using the cured composition).

Curing of the curable compositions in accordance with the present invention may be carried out by any suitable method, such as free radical and/or cationic polymerization. One or more initiators, such as a free radical initiator (e.g., photoinitiator, peroxide initiator) may be present in the curable composition. Prior to curing, the curable composition may be applied to a substrate surface in any known conventional manner, for example, by spraying, knife coating, roller coating, casting, drum coating, dipping, and the like and combinations thereof. Indirect application using a transfer process may also be used. A substrate may be any commercially relevant substrate, such as a high surface energy substrate or a low surface energy substrate, such as a metal substrate or plastic substrate, respectively. The substrates may comprise metal, paper, cardboard, glass, thermoplastics such as polyolefins, polycarbonate, acrylonitrile butadiene styrene (ABS), and blends thereof, composites, wood, leather and combinations thereof. When used as an adhesive, the curable composition may be placed between two substrates and then cured, the cured composition thereby bonding the substrates together to provide an adhered article. Curable compositions in accordance with the present invention may also be formed or cured in a bulk manner (e.g., the curable composition may be cast into a suitable mold and then cured).

Curing may be accelerated or facilitated by supplying energy to the curable composition, such as by heating the curable composition and/or by exposing the curable composition to a radiation source, such as visible or UV light, infrared radiation, and/or electron beam radiation. Thus, the cured composition may be deemed the reaction product of the curable composition, formed by curing. A curable composition may be partially cured by exposure to actinic radiation, with further curing being achieved by heating the partially cured article. For example, an article formed from the curable composition (e.g., a 3D printed article) may be heated at a temperature of from 40° C. to 120° C. for a period of time of from 5 minutes to 12 hours.

A plurality of layers of a curable composition in accordance with the present invention may be applied to a substrate surface; the plurality of layers may be simultaneously cured (by exposure to a single dose of radiation, for example) or each layer may be successively cured before application of an additional layer of the curable composition.

The curable compositions which are described herein can be used as resins in three-dimensional printing applications. Three-dimensional (3D) printing (also referred to as additive manufacturing) is a process in which a 3D digital model is manufactured by the accretion of construction material. The 3D printed object is created by utilizing the computer-aided design (CAD) data of an object through sequential construction of two dimensional (2D) layers or slices that correspond to cross-sections of 3D objects. Stereolithography (SL) is one type of additive manufacturing where a liquid resin is hardened by selective exposure to a radiation to form each 2D layer. The radiation can be in the form of electromagnetic waves or an electron beam. The most commonly applied energy source is ultraviolet, visible or infrared radiation.

The inventive curable compositions described herein may be used as 3D printing resin formulations, that is, compositions intended for use in manufacturing three-dimensional articles using 3D printing techniques. Such three-dimensional articles may be free-standing/self-supporting and may consist essentially of or consist of a composition in accordance with the present invention that has been cured. The three-dimensional article may also be a composite, comprising at least one component consisting essentially of or consisting of a cured composition as previously mentioned as well as at least one additional component comprised of one or more materials other than such a cured composition (for example, a metal component or a thermoplastic component). The curable compositions of the present invention are particularly useful in digital light printing (DLP), although other types of three-dimensional (3D) printing methods may also be practiced using the inventive curable compositions (e.g., SLA, inkjet). The curable compositions of the present invention may be used in a three-dimensional printing operation together with another material which functions as a scaffold or support for the article formed from the curable composition of the present invention.

Thus, the curable compositions of the present invention are useful in the practice of various types of three-dimensional fabrication or printing techniques, including methods in which construction of a three-dimensional object is performed in a step-wise or layer-by-layer manner. In such methods, layer formation may be performed by solidification (curing) of the curable composition under the action of exposure to radiation, such as visible, UV or other actinic irradiation. For example, new layers may be formed at the top surface of the growing object or at the bottom surface of the growing object. The curable compositions of the present invention may also be advantageously employed in methods for the production of three-dimensional objects by additive manufacturing wherein the method is carried out continuously. For example, the object may be produced from a liquid interface. Suitable methods of this type are sometimes referred to in the art as "continuous liquid interface (or interphase) product (or printing)" ("CLIP") methods. Such methods are described, for example, in WO 2014/126830; WO 2014/126834; WO 2014/126837; and Tumbleston et al., "Continuous Liquid Interface Production of 3D Objects," Science Vol. 347, Issue 6228, pp. 1349-1352 (Mar. 20, 2015), the entire disclosure of which is incorporated herein by reference in its entirety for all purposes.

When stereolithography is conducted above an oxygen-permeable build window, the production of an article using a curable composition in accordance with the present invention may be enabled in a CLIP procedure by creating an oxygen-containing "dead zone" which is a thin uncured layer of the curable composition between the window and the surface of the cured article as it is being produced. In such a process, a curable composition is used in which curing (polymerization) is inhibited by the presence of molecular oxygen; such inhibition is typically observed, for example, in curable compositions which are capable of being cured by free radical mechanisms. The dead zone thickness which is desired may be maintained by selecting various control parameters such as photon flux and the optical and curing properties of the curable composition. The CLIP process proceeds by projecting a continuous sequence of actinic radiation (e.g., UV) images (which may be generated by a digital light-processing imaging unit, for example) through an oxygen-permeable, actinic radiation- (e.g., UV-) transparent window below a bath of the curable composition maintained in liquid form. A liquid interface below the advancing (growing) article is maintained by the dead zone created above the window. The curing article is continuously drawn out of the curable composition bath above the dead zone, which may be replenished by feeding into the bath additional quantities of the curable composition to compensate for the amounts of curable composition being cured and incorporated into the growing article.

Aspects of the Invention

Illustrative, non-limiting embodiments of the present invention may be summarized as follows:

Aspect 1: A (meth)acrylate-functionalized oligomer comprised of a) an oligomeric backbone comprised of first segments and second segments and b) (meth)acrylate-functionalized end groups, wherein the first segments, second segments and (meth)acrylate-functionalized end groups are linked together by linking moieties derived from a polyisocyanate and wherein the first segments are residues of a first segment precursor containing a plurality of repeating units and a plurality of isocyanate-reactive functional groups and having a number average molecular weight of at least 250 daltons and the second segments are residues of a second segment precursor, different from the first segment precursor, containing a plurality of repeating units and a plurality of isocyanate-reactive functional groups and having a number average molecular weight of at least 250 daltons, wherein a Hansen Solubility Parameter Distance Relative Energy Difference between the first segment and the second segment is at least about 4 and not more than about 9.

Aspect 2: The (meth)acrylate-functionalized oligomer of Aspect 1, wherein the Hansen Solubility Parameter Distance Relative Energy Difference between the first segment and the second segment is at least 4 and not more than about 8.5.

Aspect 3: The (meth)acrylate-functionalized oligomer of Aspect 1 or 2, wherein the (meth)acrylate-functionalized oligomer is liquid at 25° C. or is solid at 25° C. and forms a composition which is liquid at 25° C. when combined with up to 40% on a weight/weight basis of a reactive diluent which is liquid at 25° C.

Aspect 4: The (meth)acrylate-functionalized oligomer of any one of Aspects 1-3, wherein the (meth)acrylate-functionalized oligomer has a number average molecular weight of from about 3000 to about 30,000 daltons.

Aspect 5: The (meth)acrylate-functionalized oligomer of any one of Aspects 1-4, wherein the (meth)acrylate-functionalized end groups are residues of a hydroxyalkyl (meth)acrylate, thioalkyl (meth)acrylate or an aminoalkyl (meth)acrylate.

Aspect 6: The (meth)acrylate-functionalized oligomer of any one of Aspects 1-5, wherein the (meth)acrylate-functionalized end groups are residues of hydroxyethyl (meth)acrylate.

Aspect 7: The (meth)acrylate-functionalized oligomer of any one of Aspects 1-6, wherein the polyisocyanate is a diisocyanate.

Aspect 8: The (meth)acrylate-functionalized oligomer of any one of Aspects 1-7, wherein the polyisocyanate is selected from the group consisting of toluene diisocyanates, isophorone diisocyanate, trimethylhexamethylene diisocyanates, xylylene diisocyanate, hydrogenated xylylene diisocyanate, methylene bis(4-isocyanato cyclohexane) and combinations thereof.

Aspect 9: The (meth)acrylate-functionalized oligomer of any one of Aspects 1-8, wherein the isocyanate-reactive functional groups in one or both of the first segment precursor and the second segment precursor are selected from the group consisting of hydroxyl groups, thiol groups and amino groups.

Aspect 10: The (meth)acrylate-functionalized oligomer of any one of Aspects 1-9, wherein the first segment precursor and the second segment precursor are independently selected from the group consisting of polymeric polyols.

Aspect 11: The (meth)acrylate-functionalized oligomer of any one of Aspects 1-10, wherein the first segment precursor and the second segment precursor are independently selected from the group consisting of polyether polyols, polycarbonate polyols and polyester polyols.

Aspect 12: The (meth)acrylate-functionalized oligomer of any one of Aspects 1-11, wherein the first segment precursor and the second segment precursor are independently selected from the group consisting of polypropylene glycols, polytetramethylene oxide glycols, poly(neopentyl glycol adipate) polyols, methylene bis[4-cyclohexyl(2-hydroxy-2-methylethyl)carbamate], and propoxylated neopentyl glycols.

Aspect 13: The (meth)acrylate-functionalized oligomer of any one of Aspects 1-12, wherein the first segment precursor and the second segment precursor differ from each other in number average molecular weight.

Aspect 14: The (meth)acrylate-functionalized oligomer of any one of Aspects 1-13, wherein the first segment precursor has a number average molecular weight and the second segment precursor has a number average molecular weight that is at least 1000 daltons different from the number average molecular weight of the first segment precursor.

Aspect 15: The (meth)acrylate-functionalized oligomer of any one of Aspects 1-14, wherein both the first segment precursor and the second segment precursor each independently have number average molecular weights of not more than 5000 daltons.

Aspect 16: The (meth)acrylate-functionalized oligomer of any one of Aspects 1-15, wherein both the first segment precursor and the second segment precursor each independently have number average molecular weights of from 250 to 5000 daltons which are at least 1000 daltons different from each other.

Aspect 17: The (meth)acrylate-functionalized oligomer of any one of Aspects 1-16, wherein the first segments and the second segments are distributed statistically along the oligomeric backbone Aspect 18: The (meth)acrylate-functionalized oligomer of any one of Aspects 1-16, wherein the first segments and the second segments are not distributed statistically along the oligomeric backbone.

Aspect 19: The (meth)acrylate-functionalized oligomer of any one of Aspects 1-18, wherein the oligomeric backbone comprises a plurality of linkages selected from the group consisting of urethane linkages, urea linkages and thiourethane linkages.

Aspect 20: The (meth)acrylate-functionalized oligomer of any one of Aspects 1-19, wherein:
   a) the first segment precursor is a polypropylene glycol having a number average molecular weight of 1800 to 2200 daltons and the second segment precursor is a poly(neopentyl glycol adipate) having a number average molecular weight of 1800 to 2200 daltons; or
   b) the first segment precursor is a poly(neopentyl glycol adipate) having a number average molecular weight of 400 to 600 daltons and the second segment precursor is a poly(tetramethylene oxide) glycol having a number average molecular weight of 3000 to 4000 daltons; or
   c) the first segment precursor is a poly(tetramethylene oxide) glycol having a number average molecular weight of 550 to 750 daltons and the second segment precursor is a poly(neopentyl glycol adipate) having a number average molecular weight of 1800 to 2200 daltons.

Aspect 21: A (meth)acrylate-functionalized oligomer obtained by a process comprising:
a) reacting a first segment precursor which has a number average molecular weight of at least 250 daltons and which contains a plurality of repeating units and a plurality of isocyanate-reactive functional groups with a polyisocyanate to obtain a first isocyanate-terminated intermediate oligomer;
b) reacting the first isocyanate-terminated intermediate oligomer with additional polyisocyanate and a second segment precursor which has a number average molecular weight of at least 250 daltons and which contains a plurality of repeating units and a plurality of isocyanate-reactive functional groups to obtain a second isocyanate-terminated intermediate oligomer; and
c) reacting the second isocyanate-terminated intermediate oligomer with a (meth)acrylate compound comprised of an isocyanate-reactive functional group and at least one (meth)acrylate functional group to obtain the (meth)acrylate-functionalized oligomer;
wherein the first segment precursor and second segment precursor are compositionally different from each other and wherein a Hansen Solubility Parameter Distance Relative Energy Difference between the first segment and the second segment is at least 4 and not more than 9.

Aspect 22: A (meth)acrylate-functionalized oligomer obtained by a process comprising:
a) reacting a mixture of a first segment precursor which has a number average molecular weight of at least 250 daltons and which contains a plurality of repeating units and a plurality of isocyanate-reactive functional groups and a second segment precursor which has a number average molecular weight of at least 250 daltons and which contains a plurality of repeating units and a plurality of isocyanate-reactive functional groups with a polyisocyanate to obtain an isocyanate-terminated intermediate oligomer; and
b) reacting the isocyanate-terminated intermediate oligomer with a (meth)acrylate compound comprised of an isocyanate-reactive functional group and at least one (meth)acrylate functional group to obtain the (meth)acrylate-functionalized oligomer;
wherein the first segment precursor and second segment precursor are compositionally different from each other and wherein a Hansen Solubility Parameter Distance Relative Energy Difference between the first segment and the second segment is at least 4 and not more than 9.

Aspect 23: A process for making a (meth)acrylate-functionalized oligomer comprising:
a) reacting a first segment precursor which has a number average molecular weight of at least 250 daltons and which contains a plurality of repeating units and a plurality of isocyanate-reactive functional groups with a polyisocyanate to obtain a first isocyanate-terminated intermediate oligomer;
b) reacting the first isocyanate-terminated intermediate oligomer with additional polyisocyanate and a second segment precursor which has a number average molecular weight of at least 250 daltons and which contains a plurality of repeating units and a plurality of isocyanate-reactive functional groups to obtain a second isocyanate-terminated intermediate oligomer; and
c) reacting the second isocyanate-terminated intermediate oligomer with a (meth)acrylate compound comprised of an isocyanate-reactive functional group and at least one (meth)acrylate functional group to obtain the (meth)acrylate-functionalized oligomer;
wherein the first segment precursor and second segment precursor are compositionally different from each other and wherein a Hansen Solubility Parameter Distance Relative Energy Difference between the first segment and the second segment is at least 4 and not more than 9.

Aspect 24: A process for making a (meth)acrylate-functionalized oligomer comprising:
a) reacting a mixture of a first segment precursor which has a number average molecular weight of at least 250 daltons and which contains a plurality of repeating units and a plurality of isocyanate-reactive functional groups and a second segment precursor which has a number average molecular weight of at least 250 daltons and which contains a plurality of repeating units and a plurality of isocyanate-reactive functional groups with a polyisocyanate to obtain an isocyanate-terminated intermediate oligomer; and
c) reacting the isocyanate-terminated intermediate oligomer with a (meth)acrylate compound comprised of an isocyanate-reactive functional group and at least one (meth)acrylate functional group to obtain the (meth)acrylate-functionalized oligomer;
wherein the first segment precursor and second segment precursor are compositionally different from each other and wherein a Hansen Solubility Parameter Distance Relative Energy Difference between the first segment and the second segment is at least 4 and not more than 9.

Aspect 25: A curable composition, comprising at least one (meth)acrylate-functionalized oligomer in accordance with any one of aspects 1-20 and at least one additional component other than a (meth)acrylate-functionalized oligomer in accordance with any one of aspects 1-20.

Aspect 26: A cured composition obtained by curing a curable composition comprised of at least one (meth)acrylate-functionalized oligomer in accordance with any one of Aspects 1-20.

Aspect 27: An article comprising a cured composition in accordance with Aspect 26.

Aspect 28: A method of making a cured composition, comprising exposing a curable composition comprised of at least one (meth)acrylate-functionalized oligomer in accordance with any one of Aspects 1-20 to an amount of actinic radiation effective to cure the at least one (meth)acrylate-functionalized oligomer.

Within this specification, embodiments have been described in a way which enables a clear and concise specification to be written, but it is intended and will be appreciated that embodiments may be variously combined or separated without departing from the invention. For example, it will be appreciated that all preferred features described herein are applicable to all aspects of the invention described herein.

In some embodiments, the invention herein can be construed as excluding any element or process step that does not materially affect the basic and novel characteristics of the methods and compositions described herein. Additionally, in some embodiments, the invention can be construed as excluding any element or process step not specified herein.

Although the invention is illustrated and described herein with reference to specific embodiments, the invention is not intended to be limited to the details shown. Rather, various modifications may be made in the details within the scope and range of equivalents of the claims and without departing from the invention.

EXAMPLES

Measuring Methods

In the present application, the number average molecular weight was determined by size exclusion chromatography (SEC) according to OCDE (1996), Test No. 118: Determination of the Number-Average Molecular Weight and the Molecular Weight Distribution of Polymers using Gel Permeation Chromatography, OECD Guidelines for the Testing of Chemicals, Section 1, Editions OCDE, Paris, using the following conditions:
2 columns mixed D (ref. 1110-6504)+1 column 100 Å (ref. 1110-6520)+1 column 50 Å (ref. 1110-6515), (7.8 mm×300 mm) supplied by Agilent, the stationary phase being a crosslinked polystyrene-divinylbenzene (PS-DVB) gel
flow rate of mobile phase (THF): 1 ml/min
column temperature°: 40° C.
detector: refractive index (RI)
calibration: polystyrene standard (Mw: 483.400, 215.000, 113.300, 51.150, 19.540, 10.110, 4.430, 2.930, 1.320, 575, 162 g/mol).

Example 1

To a 1 L resin kettle under dry nitrogen, equipped with a mechanical stirrer, dry nitrogen and air sparge lines, and addition funnel, is charged 648.36 g of poly(tetramethylene oxide) diol, $M_n$=3500 Da preheated to 60° C., followed by 1.5 g BHT and 0.50 g of bismuth octanoate in octanoic acid (ca. 25% w/w Bi). Tolylene diisocyanate (126.55 g as an approximately 80/20 mixture of 2,4- and 2,6-isomers) is charged through the addition funnel over the course of 90 minutes and the mixture is allowed to exotherm to 75-85° C. Once all free polyol has been consumed, the reaction temperature is set to 85° C. and 181.61 g of poly(neopentyl adipate) $M_n$=500 Da, preheated to 70° C., is charged through the addition funnel over the course of 15 minutes. The reaction is held at 85° C. for one hour and the nitrogen sparge is replaced with a dry air sparge. After allowing 10 minutes for aeration, 232.4 g of 2-hydroxyethyl acrylate are added and the reaction is held at temperature for another 60 minutes before being discharged to yield the oligomer as a hazy colorless to slightly yellow liquid.

Example 2

A 1 L resin kettle equipped with a mechanical stirrer and nitrogen inlet is charged with 17.15 g of tricyclodecanedimethanol (preheated to 90° C.), 114.12 g of caprolactone, 288.26 g of rac-lactide, 2.5 g BHT, and 1.0 g of bismuth octanoate dissolved in octanoic acid. The mixture is heated with vigorous stirring under nitrogen sparge to 95-105° C. and held until all of the lactones have been consumed as determined by HPLC, typically 14-16 hr. The polyester diol so obtained is held at 100° C. while a 3 L resin kettle configured as described in Example 1 is charged with 1014.20 g of a 1:1 mol:mol mixture of poly(ethylene oxide) diol and poly(propylene oxide) diols, each of nominal $M_n$=1000, 500 g of isobornyl methacrylate, and 0.5 g bismuth octanoate in octanoic acid. The mixture is sparged with dinitrogen and heated to 60° C. with stirring. To this mixture is fed 518.40 g of 1,3-bis-(isocyanatomethyl)cyclohexane through the addition funnel over the course of 90 minutes. Once the isocyanate level has fallen to 50% of its initial value (as determined by FT-IR spectroscopy, titration, or other suitable analytical technique), the mixture is heated to 95° C. and the polyester diol from the first kettle is transferred to the addition funnel of the second kettle, and is charged into the isocyanate-terminated prepolymer over three hours. Upon completion of the reaction between the polyester polyol and the isocyanate-terminated prepolymer (as determined by isocyanate consumption), the nitrogen sparge is replaced with a dry air sparge as in Example 1, the mixture is cooled to 85° C. and 174.78 g of 2-hydroxyethyl methacrylate is added through the addition funnel and allowed to react. The product is obtained as a high-viscosity colorless, hazy liquid when discharged.

Example 3

The process of Example 1 is repeated, but the poly (tetramethylene oxide) diol, $M_n$=3500 Da, is replaced by an equimolar amount of poly(neopentyl adipate) diol, $M_n$=2000 g/mol, and the poly(neopentyl adipate) diol, $M_n$=500 Da, is replaced by an equimolar amount of poly (tetramethylene oxide) diol. The product is obtained as a hazy colorless to light yellow semi-solid at room temperature.

Examples 4 and 5 and Comparative Examples 6 and 7

The oligomer of Example 1 (Example 4), the oligomer of Example 3 (Example 5), polyester urethane acrylate CN9783 (Example 6) (commercially available from Sartomer), or polyester urethane acrylate CN9782 (Example 7)(commercially available from Sartomer) (25 wt %) is blended with cyclic trimethylolpropane formal acrylate (55 wt %, commercially available as SR531 from Sartomer), phenyl glycidyl ether acrylate (19.5 wt %, commercially available as CN131 from Sartomer) and diphenyl(1,3,5-trimethylbenzoyl)phosphine oxide (0.5 wt %).

The mechanical properties of these formulations, in cured form, are given in FIG. 1 and Table 1. In these formulations, the oligomer of Example 1 simultaneously shows increased tensile strength, elongation, and energy at break as compared to structurally related, high molecular weight unsegmented urethane acrylate oligomers.

TABLE 1

Tensile Properties of Example 5 and 6 and Comparative Examples 7 and 8.

| | Tensile Strength (MPa) | Tensile Modulus (MPa) | Elongation (%) | Energy @ Break (J) |
|---|---|---|---|---|
| Example 4 | 4.9 ± 0.39 | 16.6 ± 5.2 | 246.5 ± 25.83 | 3.144 ± 0.53 |
| Example 5 | 2.7 ± 0.55 | 3.4 ± 0.77 | 301 ± 24.4 | 1.38 ± 0.22 |
| Comparative Example 6 | 1.3 ± 0.44 | 1.4 ± 0.53 | 196.2 ± 43.78 | 0.589 ± 0.1 |
| Comparative Example 7 | 1.1 ± 0.22 | 1.1 ± 0.13 | 217.3 ± 0.46 | 0.456 ± 0.18 |

Example 8

To a 1 L resin kettle under dry nitrogen, equipped with a mechanical stirrer, dry nitrogen and air sparge lines, and addition funnel is charged 236.6 g of poly(propylene glycol) diol, $M_n$=2000 Da, preheated to 50° C., followed by 0.5 g BHT, 0.5 g triphenylphosphite and 0.50 g of bismuth octanoate in octanoic acid (ca. 25% w/w Bi). Isophorone diisocyanate (108.85 g) is charged through the addition funnel over the course of 90 minutes and the mixture is allowed to exotherm. Once all free polyol has been consumed, the reaction temperature is set to 85° C. and 124.9 g of poly(neopentyl adipate), $M_n$=500 Da, preheated to 70° C., is charged through the addition funnel over the course of 15 minutes. The reaction is held at 85° C. for 2.5 hours and the nitrogen sparge is replaced with a dry air sparge. After allowing 10 minutes for aeration, 28.45 g of 2-hydroxyethyl acrylate are added and the reaction mixture is held at temperature for another 60 minutes before being discharged to yield the oligomer as a hazy colorless to slightly yellow liquid.

Examples 9 and 10

Figure 2:
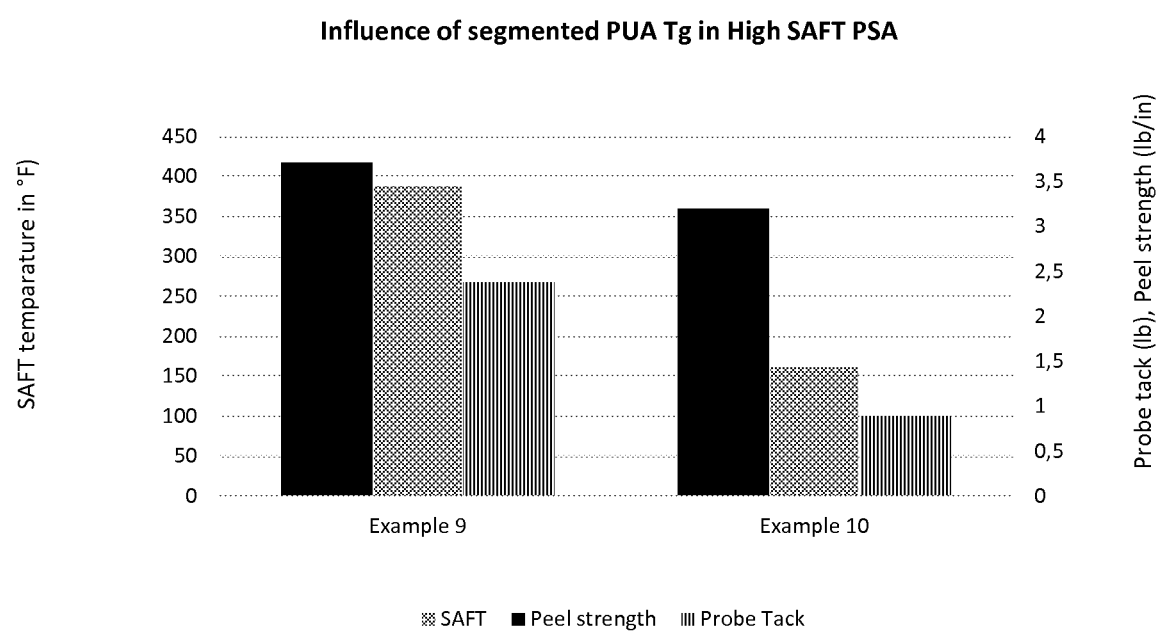
FIG. 2 illustrates in graphic form the adhesive data obtained for the formulations of Examples 9 and 10.

The oligomer of Example 3 was formulated at 28.5 wt % in combination with hydroxyethyl acrylate (28.5 wt %) and cyclic trimethylolpropane formal acrylate (38 wt %) with 5 wt % diphenyl (2,4,6-trimethylbenzoyl)phosphine oxide (referred to as Example 9). The oligomer in Example 4 was formulated with hydroxyethyl acrylate (28.5 wt %) and phenyl glycidyl ether acrylate (38 wt %, commercially available as CN131 from Sartomer) with diphenyl (2,4,6-trimethylbenzoyl)phosphine oxide as a photoinitiator (5 wt %), referred to as Example 10. The adhesive data for these formulations can be found in FIG. 2 and Table 2.

TABLE 2

Adhesive Properties of Examples 9 and 10

|  | Peel Strength (lbf/in) | SAFT (° C.) | Probe Tack (lbf/in) |
| --- | --- | --- | --- |
| Example 9 | 3.71 | 198 | 2.37 |
| Example 10 | 3.2 | 72 | 0.89 |

TABLE 3

Relative Energy Differences between Oligomer Segments and Diluents used in Example 5, 6, 9, 10 ($MPa^{1/2}$)

|  | PTMO3500-TDI2 | PNPA500-TDI2 | PTMO650-TDI2 | PNPA2000-TDI2 | PPG2000-IPDI2 | PNPA500-IPDI2 |
| --- | --- | --- | --- | --- | --- | --- |
| CN131 | 3.47 | 6.39 | 3.65 | 9.31 |  |  |
| SR531 | 7.05 | 3.97 | 5.29 | 3.49 | 6.34 | 4.02 |
| 2-hydroxyethyl acrylate | 6.01 | 4.93 | 4.54 | 13.41 | 11.09 | 9.65 |

The invention claimed is:

1. A (meth)acrylate-functionalized oligomer comprised of a) an oligomeric backbone comprised of first segments and second segments and b) (meth)acrylate-functionalized end groups, wherein the first segments, second segments and (meth)acrylate-functionalized end groups are linked together by linking moieties derived from a polyisocyanate and wherein the first segments are residues of a first segment precursor containing a plurality of repeating units and a plurality of isocyanate-reactive functional groups and having a number average molecular weight of at least 250 daltons and the second segments are residues of a second segment precursor, different from the first segment precursor, containing a plurality of repeating units and a plurality of isocyanate-reactive functional groups and having a number average molecular weight of at least 250 daltons, wherein a Hansen Solubility Parameter Distance Relative Energy Difference between the first segment and the second segment is at least about 4 $MPa^{1/2}$ and not more than about 9 $MPa^{1/2}$.

2. The (meth)acrylate-functionalized oligomer of claim 1, wherein the Hansen Solubility Parameter Distance Relative Energy Difference between the first segment and the second segment is at least 4 $MPa^{1/2}$ and not more than 8.5 $MPa^{1/2}$.

3. The (meth)acrylate-functionalized oligomer of claim 1, wherein the (meth)acrylate-functionalized oligomer is liquid at 25° C. or is solid at 25° C. and forms a composition which is liquid at 25° C. when combined with up to 40% on a weight/weight basis of a reactive diluent which is liquid at 25° C.

4. The (meth)acrylate-functionalized oligomer of claim 1, wherein the (meth)acrylate-functionalized oligomer has a number average molecular weight of from about 3000 to about 30,000 daltons.

5. The (meth)acrylate-functionalized oligomer of claim 1, wherein the (meth)acrylate-functionalized end groups are residues of a hydroxyalkyl (meth)acrylate, thioalkyl (meth)acrylate or an aminoalkyl (meth)acrylate.

6. The (meth)acrylate-functionalized oligomer of claim 1, wherein the (meth)acrylate-functionalized end groups are residues of hydroxyethyl (meth)acrylate.

7. The (meth)acrylate-functionalized oligomer of claim 1, wherein the polyisocyanate is a diisocyanate.

8. The (meth)acrylate-functionalized oligomer of claim 1, wherein the polyisocyanate is selected from the group consisting of toluene diisocyanates, isophorone diisocyanate, trimethylhexamethylene diisocyanates, xylylene diisocyanate, hydrogenated xylylene diisocyanate, methylene bis (4-isocyanato cyclohexane) and combinations thereof.

9. The (meth)acrylate-functionalized oligomer of claim 1, wherein the isocyanate-reactive functional groups in one or both of the first segment precursor and the second segment precursor are selected from the group consisting of hydroxyl groups, thiol groups and amino groups.

10. The (meth)acrylate-functionalized oligomer of claim 1, wherein the first segment precursor and the second segment precursor are independently selected from the group consisting of polymeric polyols.

11. The (meth)acrylate-functionalized oligomer of claim 1, wherein the first segment precursor and the second segment precursor are independently selected from the group consisting of polyether polyols, polycarbonate polyols and polyester polyols.

12. The (meth)acrylate-functionalized oligomer of claim 1, wherein the first segment precursor and the second segment precursor are independently selected from the group consisting of polypropylene glycols, polytetramethylene oxide glycols, poly(neopentyl glycol adipate) polyols, methylene bis [4-cyclohexyl(2-hydroxy-2-methylethyl) carbamate], and propoxylated neopentyl glycols.

13. The (meth)acrylate-functionalized oligomer of claim 1, wherein the first segment precursor and the second segment precursor differ from each other in number average molecular weight.

14. The (meth)acrylate-functionalized oligomer of claim 1, wherein the first segment precursor has a number average molecular weight and the second segment precursor has a number average molecular weight that is at least 1000 daltons different from the number average molecular weight of the first segment precursor.

15. The (meth)acrylate-functionalized oligomer of claim 1, wherein both the first segment precursor and the second segment precursor each independently have number average molecular weights of not more than 5000 daltons.

16. The (meth)acrylate-functionalized oligomer of claim 1, wherein both the first segment precursor and the second segment precursor each independently have number average molecular weights of from 250 to 5000 daltons which are at least 1000 daltons different from each other.

17. The (meth)acrylate-functionalized oligomer of claim 1, wherein the first segments and the second segments are distributed statistically along the oligomeric backbone.

18. The (meth)acrylate-functionalized oligomer of claim 1, wherein the first segments and the second segments are not distributed statistically along the oligomeric backbone.

19. The (meth)acrylate-functionalized oligomer of claim 1, wherein the oligomeric backbone comprises a plurality of linkages selected from the group consisting of urethane linkages, urea linkages and thiourethane linkages.

20. The (meth)acrylate-functionalized oligomer of claim 1, wherein:
 a) the first segment precursor is a polypropylene glycol having a number average molecular weight of 1800 to 2200 daltons and the second segment precursor is a poly(neopentyl glycol adipate) having a number average molecular weight of 1800 to 2200 daltons; or
 b) the first segment precursor is a poly(neopentyl glycol adipate) having a number average molecular weight of 400 to 600 daltons and the second segment precursor is a poly(tetramethylene oxide) glycol having a number average molecular weight of 3000 to 4000 daltons; or
 c) the first segment precursor is a poly(tetramethylene oxide) glycol having a number average molecular weight of 550 to 750 daltons and the second segment precursor is a poly(neopentyl glycol adipate) having a number average molecular weight of 1800 to 2200 daltons.

21. A (meth)acrylate-functionalized oligomer having a backbone comprising a first segment and a second segment and obtained by a process comprising:
 a) reacting a first segment precursor of the first segment which has a number average molecular weight of at least 250 daltons and which contains a plurality of repeating units and a plurality of isocyanate-reactive functional groups with a polyisocyanate to obtain a first isocyanate-terminated intermediate oligomer;
 b) reacting the first isocyanate-terminated intermediate oligomer with additional polyisocyanate and a second segment precursor of the second segment which has a number average molecular weight of at least 250 daltons and which contains a plurality of repeating units and a plurality of isocyanate-reactive functional groups to obtain a second isocyanate-terminated intermediate oligomer; and
 c) reacting the second isocyanate-terminated intermediate oligomer with a (meth)acrylate compound comprised of an isocyanate-reactive functional group and at least one (meth)acrylate functional group to obtain the (meth)acrylate-functionalized oligomer;
 wherein the first segment precursor and second segment precursor are compositionally different from each other and wherein a Hansen Solubility Parameter Distance Relative Energy Difference between the first segment and the second segment is at least 4 $MPa^{1/2}$ and not more than 9 $MPa^{1/2}$.

22. A (meth)acrylate-functionalized oligomer having a backbone comprising a first segment and a second segment and obtained by a process comprising:
 a) reacting a mixture of a first segment precursor of the first segment which has a number average molecular weight of at least 250 daltons and which contains a plurality of repeating units and a plurality of isocyanate-reactive functional groups and a second segment precursor of the second segment which has a number average molecular weight of at least 250 daltons and which contains a plurality of repeating units and a plurality of isocyanate-reactive functional groups with a polyisocyanate to obtain an isocyanate-terminated intermediate oligomer; and
 b) reacting the isocyanate-terminated intermediate oligomer with a (meth)acrylate compound comprised of an isocyanate-reactive functional group and at least one (meth)acrylate functional group to obtain the (meth)acrylate-functionalized oligomer;
 wherein the first segment precursor and second segment precursor are compositionally different from each other and wherein a Hansen Solubility Parameter Distance Relative Energy Difference between the first segment and the second segment is at least 4 $MPa^{1/2}$ and not more than 9 $MPa^{1/2}$.

23. A process for making a (meth)acrylate-functionalized oligomer having a backbone comprising a first segment and a second segment, said method comprising:
 a) reacting a first segment precursor of the first segment which has a number average molecular weight of at least 250 daltons and which contains a plurality of repeating units and a plurality of isocyanate-reactive functional groups with a polyisocyanate to obtain a first isocyanate-terminated intermediate oligomer;
 b) reacting the first isocyanate-terminated intermediate oligomer with additional polyisocyanate and a second segment precursor of the second segment which has a number average molecular weight of at least 250 daltons and which contains a plurality of repeating units and a plurality of isocyanate-reactive functional groups to obtain a second isocyanate-terminated intermediate oligomer; and
 c) reacting the second isocyanate-terminated intermediate oligomer with a (meth)acrylate compound comprised of an isocyanate-reactive functional group and at least one (meth)acrylate functional group to obtain the (meth)acrylate-functionalized oligomer;
 wherein the first segment precursor and second segment precursor are compositionally different from each other and wherein a Hansen Solubility Parameter Distance Relative Energy Difference between the first segment and the second segment is at least 4 $MPa^{1/2}$ and not more than 9 $MPa^{1/2}$.

24. A process for making a (meth)acrylate-functionalized oligomer having a backbone comprising a first segment and a second segment and comprising:

a) reacting a mixture of a first segment precursor of the first segment which has a number average molecular weight of at least 250 daltons and which contains a plurality of repeating units and a plurality of isocyanate-reactive functional groups and a second segment precursor of the second segment which has a number average molecular weight of at least 250 daltons and which contains a plurality of repeating units and a plurality of isocyanate-reactive functional groups with a polyisocyanate to obtain an isocyanate-terminated intermediate oligomer; and b) reacting the isocyanate-terminated intermediate oligomer with a (meth)acrylate compound comprised of an isocyanate-reactive functional group and at least one (meth)acrylate functional group to obtain the (meth)acrylate-functionalized oligomer;

wherein the first segment precursor and second segment precursor are compositionally different from each other and wherein a Hansen Solubility Parameter Distance Relative Energy Difference between the first segment and the second segment is at least 4 $MPa^{1/2}$ and not more than 9 $MPa^{1/2}$.

25. A curable composition, comprising at least one (meth)acrylate-functionalized oligomer in accordance with claim 1 and at least one additional component other than a (meth)acrylate-functionalized oligomer in accordance with claim 1.

26. A cured composition obtained by curing a curable composition comprised of at least one (meth)acrylate-functionalized oligomer in accordance with claim 1.

27. An article comprising a cured composition in accordance with claim 26.

28. A method of making a cured composition, comprising exposing a curable composition comprised of at least one (meth)acrylate-functionalized oligomer in accordance with claim 1 to an amount of actinic radiation effective to cure the at least one (meth)acrylate-functionalized oligomer.

* * * * *